US011243562B2

United States Patent
Kim et al.

(10) Patent No.: US 11,243,562 B2
(45) Date of Patent: Feb. 8, 2022

(54) ELECTRONIC DEVICE COMPRISING BIOMETRIC SENSOR INTEGRATED IN DISPLAY

(71) Applicant: Samsung Electronics Co., Ltd., Gyeonggi-do (KR)

(72) Inventors: Jinman Kim, Gyeongsangbuk-do (KR); Suna Kim, Gyeonggi-do (KR); Joohan Kim, Gyeongsangbuk-do (KR); Jinwoo Park, Gyeongsangbuk-do (KR); Hunjo Jung, Seoul (KR); Eunyeung Lee, Gyeongsangbuk-do (KR); Hyunsuk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 16/487,600

(22) PCT Filed: Feb. 7, 2018

(86) PCT No.: PCT/KR2018/001670
§ 371 (c)(1),
(2) Date: Aug. 21, 2019

(87) PCT Pub. No.: WO2018/155851
PCT Pub. Date: Aug. 30, 2018

(65) Prior Publication Data
US 2020/0057467 A1 Feb. 20, 2020

(30) Foreign Application Priority Data
Feb. 24, 2017 (KR) .................. 10-2017-0025068

(51) Int. Cl.
*G06K 9/00* (2006.01)
*G06F 1/16* (2006.01)
*G06F 21/32* (2013.01)

(52) U.S. Cl.
CPC .............. *G06F 1/16* (2013.01); *G06F 1/1637* (2013.01); *G06F 21/32* (2013.01); *G06K 9/0002* (2013.01)

(58) Field of Classification Search
CPC .......... G06F 1/16; G06F 1/1637; G06F 21/32; G06F 1/1643; G06K 9/0002; G06K 9/00053
(Continued)

(56) References Cited

U.S. PATENT DOCUMENTS

2006/0034499 A1* 2/2006 Shinoda ............. G06K 9/00053
382/124
2015/0123860 A1 5/2015 Park et al.
(Continued)

FOREIGN PATENT DOCUMENTS

KR 10-1042378 B1 6/2011
KR 10-2012-0122968 A 11/2012
(Continued)

*Primary Examiner* — Abdul-Samad A Adediran
(74) *Attorney, Agent, or Firm* — Cha & Reiter, LLC

(57) ABSTRACT

Various embodiments of the present invention relate to an electronic device comprising a biometric sensor disposed in a display, and the electronic device comprises: a transparent cover; a display module located under the transparent cover, wherein the display module comprises a display layer in which pixels are formed and one or more additional layers formed under the display layer, and an opening is formed in at least a partial region of at least one layer among the one or more layers; a first printed circuit board having a biometric sensor module, which is disposed under the display module and makes contact with the opening; and a second printed circuit board electrically connected to the first printed circuit board and the display module, wherein a pressure sensor module can be disposed in the surrounding region of the biometric sensor module under the display (Continued)

module in the second printed circuit board. In addition, other embodiments are possible.

14 Claims, 32 Drawing Sheets

(58) Field of Classification Search
USPC .......................................................... 382/124
See application file for complete search history.

(56) References Cited

U.S. PATENT DOCUMENTS

| | | |
|---|---|---|
| 2016/0300096 A1 | 10/2016 | Kim et al. |
| 2017/0045918 A1 | 2/2017 | Han et al. |
| 2017/0046558 A1 | 2/2017 | Li et al. |
| 2017/0103246 A1 | 4/2017 | Pi et al. |
| 2017/0124370 A1* | 5/2017 | He .................... G06K 9/0002 |
| 2017/0372123 A1 | 12/2017 | Kim et al. |
| 2018/0151641 A1* | 5/2018 | Choo .................. G06F 1/1643 |

FOREIGN PATENT DOCUMENTS

| | | |
|---|---|---|
| KR | 10-2015-0051054 A | 5/2015 |
| KR | 10-2016-0071352 A | 6/2016 |
| KR | 10-2016-0091253 A | 8/2016 |
| KR | 10-2016-0120084 A | 10/2016 |
| KR | 10-2017-0020148 A | 2/2017 |
| WO | 2016/055007 A1 | 4/2016 |

* cited by examiner

ELECTRONIC DEVICE COMPRISING BIOMETRIC SENSOR INTEGRATED IN DISPLAY

CLAIM OF PRIORITY

This application is a National Phase Entry of PCT International Application No. PCT/KR2018/001670 which was filed on Feb. 7, 2018, and claims a priority to Korean Patent Application No. 10-2017-0025068, which was filed on Feb. 24, 2017, the contents of which are incorporated herein by reference.

TECHNICAL FIELD

Various embodiments of the disclosure relate to an electronic device including a biometric sensor integrated in a display.

BACKGROUND ART

The role of a display in a portable electronic device is becoming important, and the area occupied by a display in the limited size of a portable electronic device is gradually increasing. As the area occupied by the display gradually increases, it may be considered that a biometric sensor (e.g., a fingerprint sensor) that has been provided separately from a display is integrated inside the display of a portable electronic device. A portable electronic device may include a fingerprint sensor, which is one of biometric sensors, in a lower area of the display thereof, and a fingerprint detection area for recognizing a user's fingerprint may be set on the basis of a portion of the display area of the display. A portable electronic device may incorporate a fingerprint sensor as one of components constituting the display thereof. The fingerprint sensor may recognize a fingerprint by being interlocked with the display. For example, the portable electronic device may recognize a user's fingerprint via a fingerprint detection area, which is a partial area of the display, using the fingerprint sensor. The portable electronic device may perform a user authentication function on the basis of the recognized fingerprint.

DISCLOSURE OF INVENTION

Technical Problem

In recognizing a fingerprint using a fingerprint sensor, the accuracy of fingerprint recognition of a portable electronic device may be determined on the basis of a distance between the point to be touched by the user's fingerprint (e.g., a transparent cover) and a fingerprint sensor built in the portable electronic device. For example, the greater the distance between the point to be touched by the user's fingerprint and the fingerprint sensor, the lower the fingerprint recognition rate (e.g., the accuracy of fingerprint recognition) may be, and the closer the distance, the higher the fingerprint recognition rate may be. When fingerprint recognition is performed through a screen of a portable electronic device, a fingerprint sensor may be included inside the portable electronic device. The screen of the portable electronic device has a structure in which multiple panels are stacked, and a fingerprint sensor may also be integrated with the multiple panels. Since the multiple panels are stacked, the fingerprint sensor embedded in the portable electronic device and the point to be touched by the fingerprint may not be adjacent to each other. In addition, in the portable electronic device, an air layer (air gap) may be maintained around the fingerprint sensor in consideration of prevention of damage and a manufacturing tolerance of the fingerprint sensor. When the fingerprint sensor is disposed inside the portable electronic device, the fingerprint recognition rate may be lowered due to the layout structure of the fingerprint sensor.

Meanwhile, when the fingerprint sensor is integrated into the display in the portable electronic device, the recognition rate of the stylus pen for an electromagnetic induction panel (e.g., a digitizer) may be deteriorated. In the portable electronic device, a portion of the electromagnetic induction panel, which corresponds to the portion in which the fingerprint sensor is mounted, is removed, and thus the recognition rate of the stylus pen may be lowered due to the removed portion.

Various embodiments of the disclosure are able to increase a fingerprint recognition rate by mounting a fingerprint sensor as close to a point to be touched by a user's fingerprint as possible. Various embodiments of the disclosure are able to prevent deterioration of the recognition rate of a stylus pen by attaching a fingerprint sensor to an upper panel using a transparent adhesive member.

Solution to Problem

An electronic device according to various embodiments of the disclosure may include: a transparent cover; a display module located under the transparent cover and including a display layer having pixels formed therein and one or more additional layers formed under the display layer, at least one of the one or more additional layers having an opening formed in at least a partial area thereof; a first printed circuit board having a biometric sensor disposed under the display module to face the opening; and a second printed circuit board electrically connected to the first printed circuit board and the display module. A pressure sensor module may be disposed on the second printed circuit board in a peripheral area of the biometric sensor module under the display module.

Advantageous Effects of Invention

According to various embodiments of the disclosure, a biometric sensor may be arranged corresponding to a partial area of a display. According to various embodiments of the disclosure, since the biometric sensor is disposed such that the distance between the biometric sensor and a point to be touched by a user's fingerprint is minimized, it is possible to increase a fingerprint recognition rate for a user. According to various embodiments of the disclosure, even if the biometric sensor is disposed under the display, it is possible to minimize the degradation of the recognition rate for a stylus pen since a transparent adhesive member is used. According to various embodiments of the disclosure, it is possible to increase the convenience of a user in utilizing the fingerprint sensor disposed inside the display.

MODE FOR THE INVENTION

Figure 1:
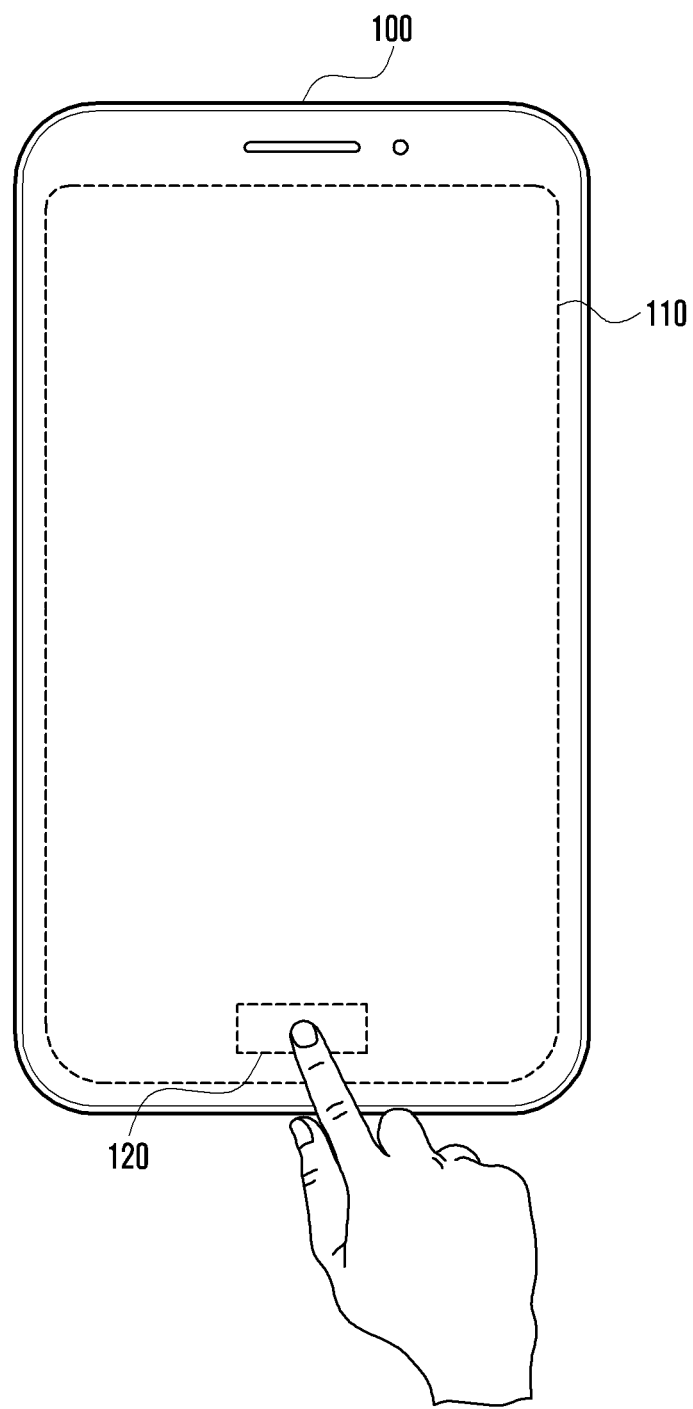
FIG. 1 is a view illustrating the front portion of an electronic device in which a biometric sensor according to various embodiments of the disclosure is integrated into an electronic device.

Hereinafter, the disclosure is described with reference to the accompanying drawings. Although specific embodiments are illustrated in the drawings and related detailed descriptions are discussed in the specification, the disclosure may have various modifications and several embodiments. However, various embodiments of the disclosure are not limited to a specific implementation form and it should be understood that the disclosure includes all changes and/or equivalents and substitutes included in the spirit and scope of various embodiments of the disclosure. In connection with descriptions of the drawings, similar components are designated by the same reference numeral.

In various embodiments of the disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

In the disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

It should be appreciated that various embodiments of the disclosure and the terms used therein are not intended to limit the technological features set forth herein to particular embodiments and include various changes, equivalents, or replacements for a corresponding embodiment. Unless otherwise defined herein, all terms including technical or scientific terms used herein have the same meanings as commonly understood by those skilled in the art to which the disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

An electronic device according to various embodiments of the disclosure may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head-Mounted-Device (HMD), such as electronic glasses, electronic clothes, an electronic bracelet, an electronic necklace, an electronic appcessary, an electronic tattoo, and a smart watch).

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), which are equipped with an antenna. The electronic device according to various embodiments of the disclosure may also be a combination of the devices listed above. Further, the electronic device according to various embodiments of the disclosure may be a flexible device. It is apparent to those skilled in the art that the electronic device according to various embodiments of the disclosure is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

FIG. 1 is a view illustrating the front portion of an electronic device in which a biometric sensor according to various embodiments of the disclosure is integrated into an electronic device.

Referring to FIG. 1, an electronic device 100 may display a screen through a display module 110. The electronic device 100 according to various embodiments may include a biometric sensor disposed in an area corresponding to a partial area 120 (e.g., a fingerprint recognition area) of the display module 110. For example, the electronic device 100 may acquire user fingerprint information through the partial area 120 of the display module 110 using a biometric sensor. The electronic device 100 may perform a user authentication function on the basis of the obtained user fingerprint information.

Figure 2:
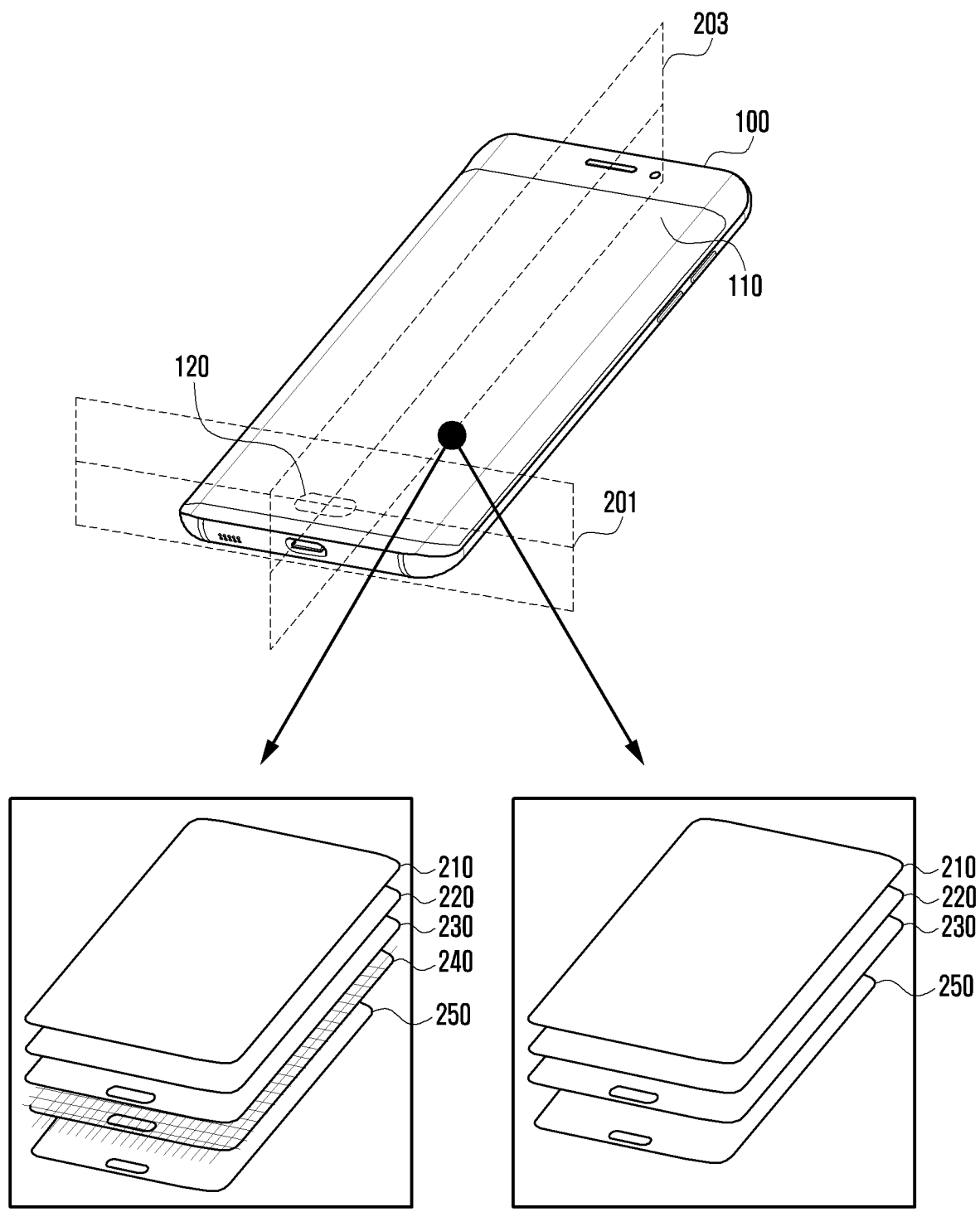
FIG. 2 is a view illustrating a stacked structure of panels for implementing a display module of an electronic device according to various embodiments of the disclosure.

FIG. 2 is a view illustrating a stacked structure of panels for implementing a display module of an electronic device according to various embodiments of the disclosure.

Figure 7A:
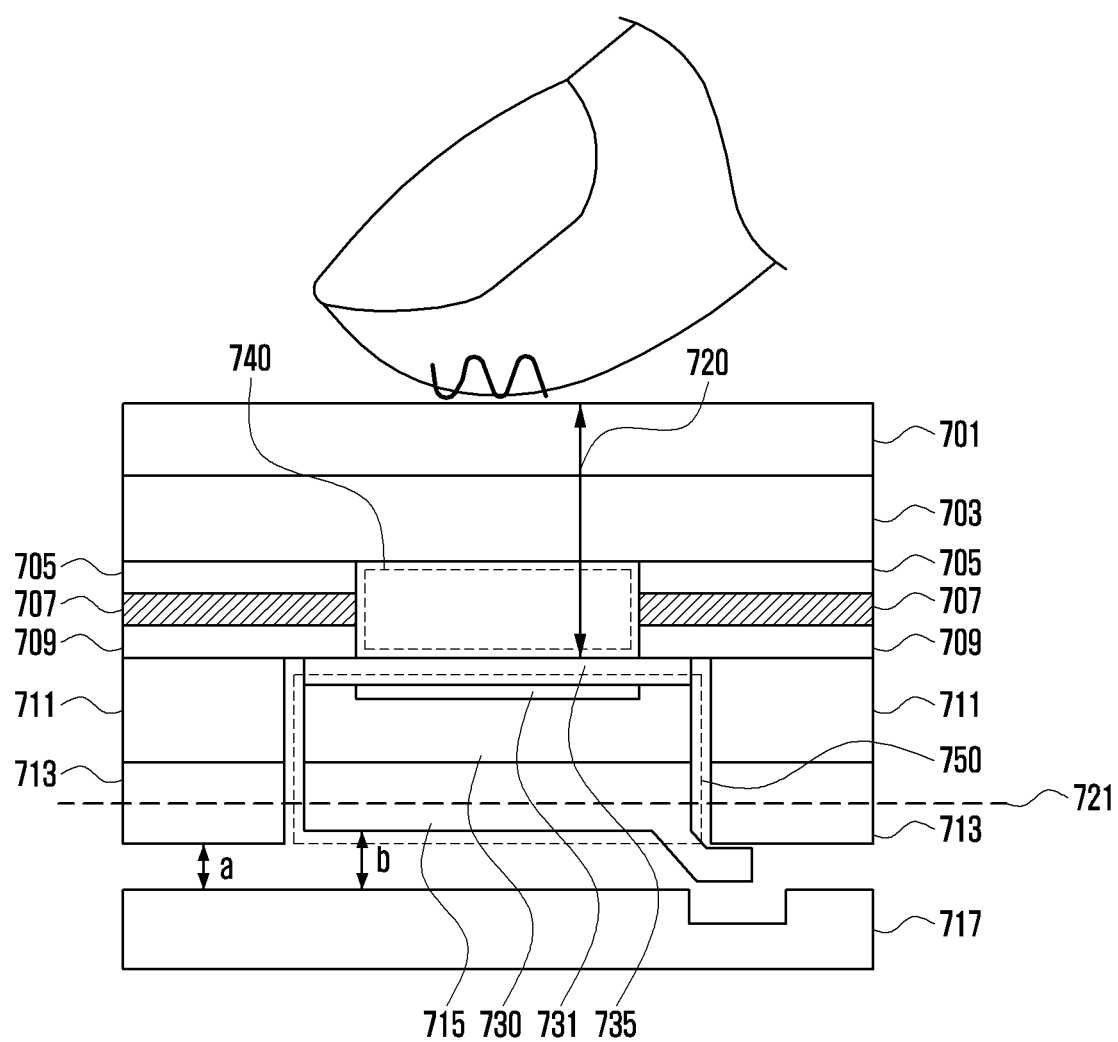
FIG. 7A is a cross-sectional view of an electronic device corresponding to a stacked structure of multiple panels constituting an electronic device according to various embodiments of the disclosure.
Figure 8:
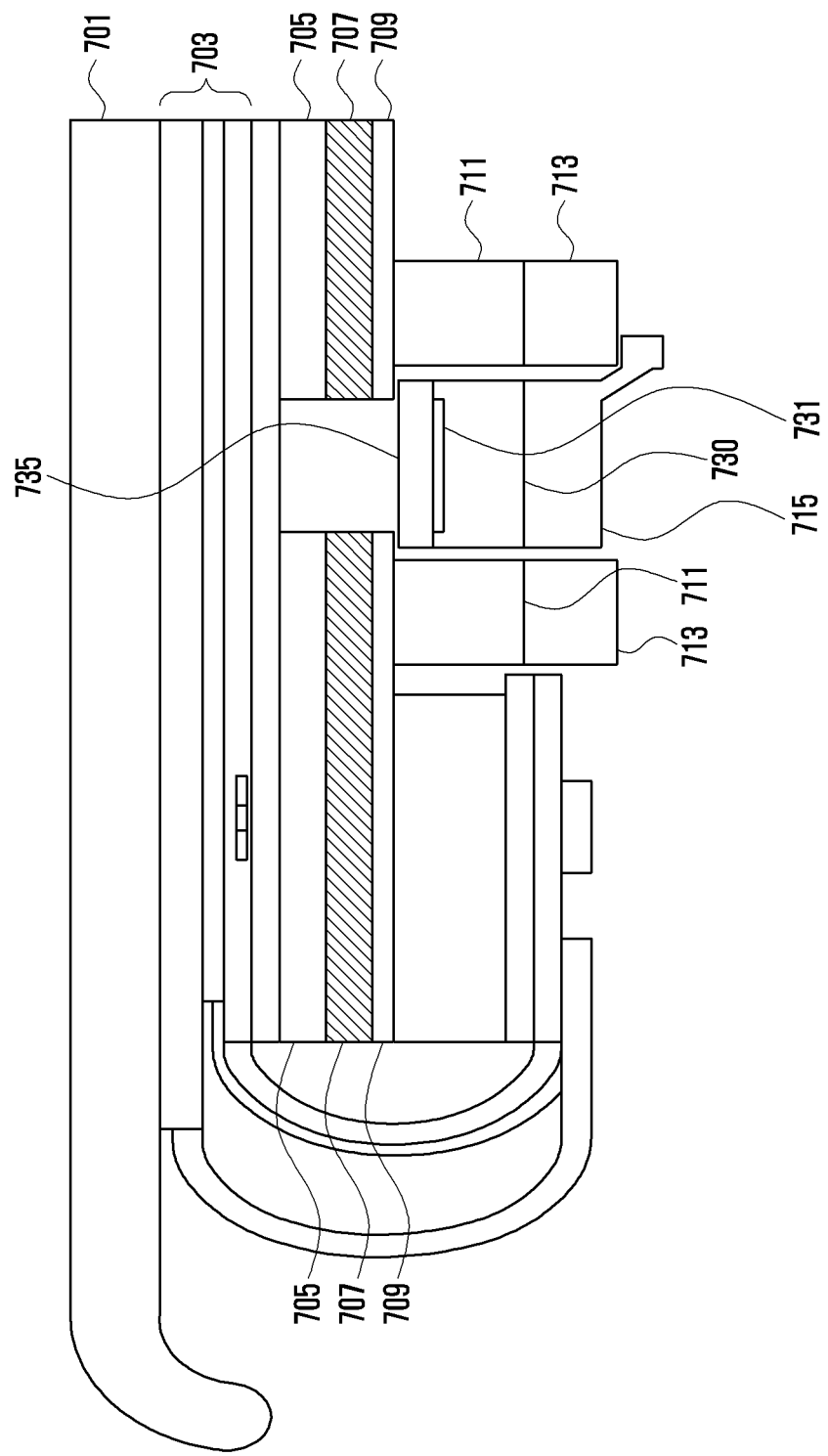
FIG. 8 is a cross-sectional view of an electronic device illustrating a stacked structure of multiple panels included in an electronic device according to various embodiments of the disclosure on the basis of a longitudinal section.

Referring to FIG. 2, the electronic device 100 may display a screen through the display module 110, and may recognize a user's fingerprint on the basis of the partial area 120 of the display module 110. The display module 110 of the electronic device 100 may be implemented in the form in which multiple panels are stacked. For example, the display module 110 may include, below a transparent cover, a touch screen panel (TSP) 220, a support member (e.g., an emboss sheet and/or a cushion sheet, a black layer, etc.) 230, an electromagnetic induction panel (e.g., a digitizer) 240, and a heat dissipate (e.g., a graphite (Gr) sheet and/or a copper (Cu) sheet) 250, from which at least one component (e.g., the electromagnetic induction panel) may be omitted. For example, the display module 110 may include the touch screen panel 220, the support member 230, and the heat dissipation sheet 250, except for the electromagnetic induction panel 240. In the following description, FIG. 7A illustrates a cross-sectional view based on a transversal cross section 201 of the electronic device 100, and FIG. 8 illustrates a cross-sectional view based on a longitudinal cross section 203 of the electronic device 100.

The transparent cover 210 (e.g., a window panel) is a transparent panel and is able to protect the display module 110 from an external impact. Specifically, the transparent cover 210 is able to protect the touch screen panel 220 disposed on the top of the display module 110. For example, the electronic device 100 may receive a touch input of a user via the touch screen panel 220. The transparent cover 210 may be disposed on the touch screen panel 220 such that the touch screen panel 220 is not directly touched by the user's touch input. The transparent cover 210 and the touch screen panel 220 may be attached to each other by a transparent adhesive member (optically clear adhesive (OCA)).

The touch screen panel 220 may receive the user's touch input. The touch screen panel 220 may receive the touch input on the basis of at least one of, for example, an electrostatic manner, a pressure-sensitive manner, an infrared manner, or an ultrasonic manner. The touch screen panel 220 may be disposed below the transparent cover 210. The touch screen panel 220 may include a panel for detecting a touch input and a panel for displaying a screen. For example, the panel for detecting a touch input may be disposed between the transparent cover 210 and the panel for displaying a screen, or may be disposed inside the panel for displaying a screen. Hereinafter, the touch screen panel 220 may be described as a display or a display including a touch sensor.

The support member 230 is a member for absorbing impact to the touch screen panel 220. The support member 230 may include an embossed sheet including an uneven pattern, a cushion sheet including a sponge, and/or a black layer. For example, the black layer may block or reflect light emitted from the display and directed to the lower portion of the display. For example, the black layer may be formed integrally with the embossed sheet, and/or the cushion sheet. The support member 230 may be disposed under the touch screen panel 220, and the embossed sheet and the cushion sheet may be disposed at different positions. The support member 230 is illustrated as being disposed between the touch screen panel 220 and the electromagnetic induction panel 240, but is not limited thereto. For example, the embossed sheet of the support member 230 may be disposed above the electromagnetic induction panel 240, and the cushion sheet of the support member 230 may be disposed below the electromagnetic induction panel 240. The cushion sheet of the support member 230 may be omitted. The support member 230 according to various embodiments may include an opening formed in at least a partial area corresponding to the biometric sensor.

The electromagnetic induction panel 240 (e.g., a digitizer) may be a panel configured to detect a stylus pen input. For example, the electromagnetic induction panel 240 may include a printed circuit board (e.g., a Flexible Printed Circuit Board (FPCB)) and a shielding sheet. The shielding sheet is capable of preventing interference between the components included in the electronic device 100 (e.g., the display module, the printed circuit board, and the electromagnetic induction panel), in which the interference is caused due to electromagnetic fields generated from the components. By blocking the electromagnetic field generated from the components, the shielding sheet is capable of causing a stylus pen input to be accurately transferred to a coil included in the electromagnetic induction panel 240. The electromagnetic induction panel 240 according to various embodiments may include an opening formed in at least the partial area corresponding to the biometric sensor integrated in the electronic device 100.

The heat dissipation sheet 250 is able to limit the temperature rise inside the electronic device 100 by dissipating heat generated in the electronic device 100. The heat dissipation sheet 250 may include a graphite (Gr) sheet and/or a copper (Cu) sheet, and may be disposed under the electromagnetic induction panel 240. The disposed position of the heat dissipation sheet 250 may be varied, and may be disposed above or below the support member 230. The heat dissipation sheet 250 according to various embodiments may include an opening formed in at least the partial area corresponding to the biometric sensor integrated in the electronic device 100.

An electronic device according to various embodiments of the disclosure may include a display module having a structure in which multiple panels are stacked. For example, the multiple panels may be bonded to each other by a transparent adhesive member.

Figure 3:
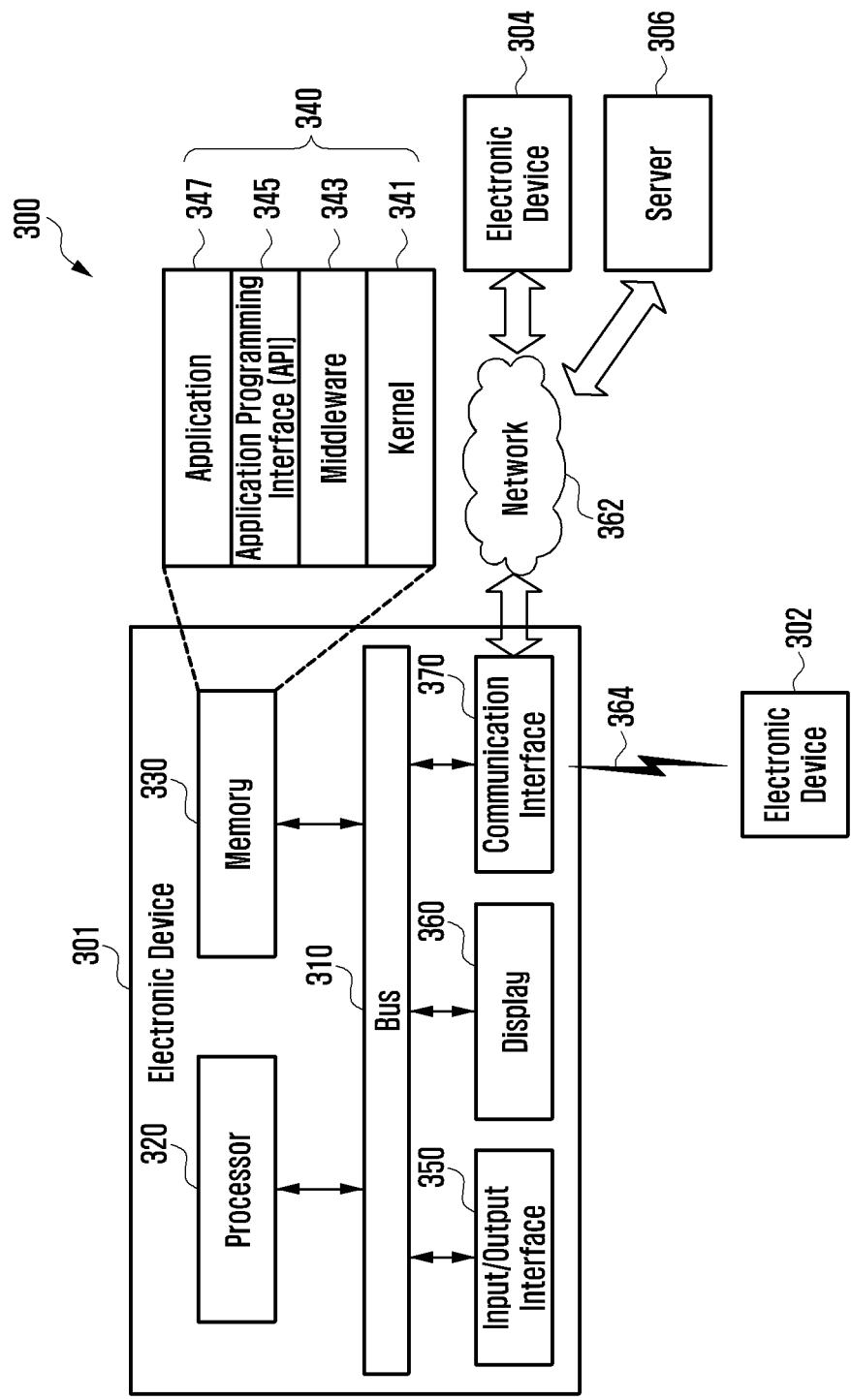
FIG. 3 is a view illustrating an electronic device within a network environment according to various embodiments of the disclosure.

FIG. 3 illustrates a network environment 300 including an electronic device 301 according to various embodiments of the disclosure.

Referring to FIG. 3, the electronic device 301, 302, 304 may connect to the server 306 via the network 362 or short-wireless communication 364.

The electronic device 301 may include a bus 310, a processor 320, a memory 330, an input/output interface 350, a display 360, and a communication interface 370. According to some embodiments, at least one of the above described components may be omitted from the electronic device 301 or another component may be further included in the electronic device 301. The bus 310 may be a circuit connecting the above described components 320, 330, and 350-370 and transmitting communications (e.g., control messages and/or data) between the above described components. The processor 320 is capable of including one or more of the following: a central processing unit (CPU), an application processor (AP), and a communication processor (CP). The processor 320 is capable of controlling at least one of other components of the electronic device 301 and/or processing data or operations related to communication.

The memory 330 is capable of including volatile memory and/or non-volatile memory. The memory 330 is capable of storing data or commands related to at least one of other components of the electronic device 301. According to an embodiment, the memory 330 is capable of storing software and/or a program module 340. For example, the program module 340 is capable of including a kernel 341, middleware 343, application programming interface (API) 345, application programs (or applications) 347, etc. The kernel 341, middleware 343 or at least part of the API 345 may be called an operating system (OS). The kernel 341 is capable of controlling or managing system resources (e.g., the bus 310, processor 320, memory 330, etc.) used to execute operations or functions of other programs (e.g., the middleware 343, API 345, and application programs 347). The kernel 341 provides an interface capable of allowing the middleware 343, API 345, and application programs 347 to access and control/manage the individual components of the electronic device 301.

The middleware 343 is capable of mediating between the API 345 or application programs 347 and the kernel 341 so that the API 345 or the application programs 347 can communicate with the kernel 341 and exchange data therewith. The middleware 343 is capable of processing one or more task requests received from the application programs 347 according to the priority. For example, the middleware 343 is capable of assigning a priority for use of system resources of the electronic device 301 (e.g., the bus 310, processor 320, memory 330, etc.) to at least one of the application programs 347. For example, the middleware 343 processes one or more task requests according to a priority assigned to at least one application program, thereby performing scheduling or load balancing for the task requests. The API 345 refers to an interface configured to allow the application programs 347 to control functions provided by the kernel 341 or the middleware 343. The API 345 is capable of including at least one interface or function (e.g., instructions) for file control, window control, image process, text control, or the like. The input/output interface 350 is capable of transferring instructions or data, received from the user or external devices, to one or more components of the electronic device 301. The input/output interface 350 is capable of outputting instructions or data, received from one or more components of the electronic device 301, to the user or external devices.

The display 360 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 360 is capable of displaying various types of content (e.g., texts, images, videos, icons, symbols, etc.). The display 360 may also be implemented with a touch screen. In this case, the display 360 is capable of receiving touches, gestures, proximity inputs or hovering inputs, via a stylus pen, or a user's body.

The communication interface 370 is capable of establishing communication between the electronic device 301 and an external device (e.g., a first external device 302, a second electronic device 304, or a server 306). For example, the communication interface 370 is capable of communicating with an external device (e.g., a second external device 304 or a server 306) connected to the network 362 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-wireless communication 364. Short-wireless communication 364 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called "Beidou"), Galileo, the European global satellite-based navigation system, according to GNSS using areas, bandwidths, etc. In the disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 362 may include at least one of the following: a telecommunications network, e.g., a computer network (e.g., LAN or WAN), the Internet, and a telephone network.

The first and second external electronic devices 302 and 304 are each identical to or different from the electronic device 301, in terms of type. According to an embodiment, the server 306 is capable of including a group of one or more servers. According to various embodiments, part or all of the operations executed on the electronic device 301 may be executed on another electronic device or a plurality of other electronic devices (e.g., electronic devices 302 and 304 or a server 306). According to an embodiment, when the electronic device needs to perform a function or service automatically or according to a request, it does not perform the function or service, but is capable of additionally requesting at least part of the function related to the function or service from other electronic device (e.g., electronic devices 302 and 304 or a server 306). The other electronic device (e.g., electronic devices 302 and 304 or a server 306) is capable of executing the requested function or additional functions, and transmitting the result to the electronic device 301. The electronic device 301 processes the received result, or further proceeds with additional processes, to provide the requested function or service. To this end, the electronic device 301 may employ cloud computing, distributed computing, or client-server computing technology.

Figure 4:
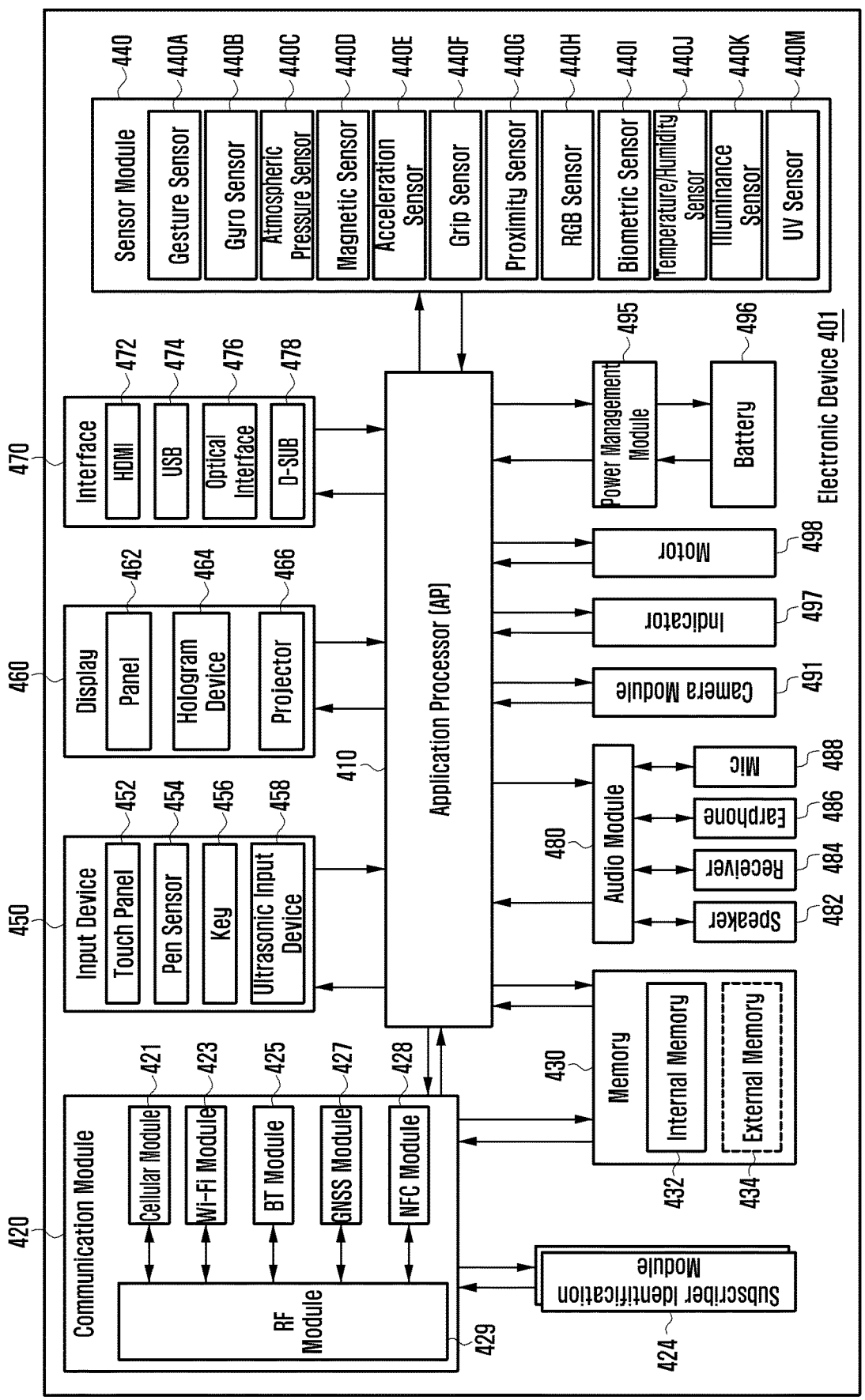
FIG. 4 is a block diagram of an electronic device according to various embodiments of the disclosure.

FIG. 4 is a detailed block diagram showing a configuration of an electronic device 401 according to various embodiments. For example, the electronic device 401 is capable of including part or all of the components in the electronic device 301 shown in FIG. 3. The electronic device 401 is capable of including one or more processors 410 (e.g., Application Processors (APs)), a communication module 420, a Subscriber Identification Module (SIM) 424, a memory 430, a sensor module 440, an input device 450, a display 460, an interface 470, an audio module 480, a camera module 491, a power management module 495, a battery 496, an indicator 497, and a motor 498. The processor 410 is capable of driving, for example, an operating system or an application program to control a plurality of hardware or software components connected to the processor 410, processing various data, and performing operations. The processor 410 may be implemented as, for example, a System on Chip (SoC). According to an embodiment, the processor 410 may further include a graphic processing unit (GPU) and/or an image signal processor. The processor 410 may also include at least part of the components shown in FIG. 4, e.g., a cellular module 421. The processor 410 is capable of loading commands or data received from at least one of other components (e.g., a non-volatile memory) on a volatile memory, processing the loaded commands or data. The processor 410 is capable of storing various data in a non-volatile memory.

The communication module 420 may include the same or similar configurations as the communication interface 370 shown in FIG. 3. For example, the communication module 420 is capable of including a cellular module 421, WiFi module 423, Bluetooth (BT) module 425, GNSS module 427 (e.g., a GPS module, Glonass module, Beidou module or Galileo module), NFC module 428, and Radio Frequency (RF) module 429. The cellular module 421 is capable of providing a voice call, a video call, an SMS service, an Internet service, etc., through a communication network, for example. According to an embodiment, the cellular module 421 is capable of identifying and authenticating an electronic device 401 in a communication network by using a subscriber identification module (SIM) 424 (e.g., a SIM card). According to an embodiment, the cellular module 421 is capable of performing at least part of the functions provided by the processor 410. According to an embodiment, the cellular module 421 is also capable of including a communication processor (CP). Each of the WiFi module 423, the BT module 425, the GNSS module 427, and the NFC module 428 is capable of including a processor for processing data transmitted or received through the corresponding module. According to embodiments, at least part of the cellular module 421, WiFi module 423, BT module 425, GNSS module 427, and NFC module 428 (e.g., two or more modules) may be included in one integrated chip (IC) or one IC package. The RF module 429 is capable of transmission/reception of communication signals, e.g., RF signals. The RF module 429 is capable of including a transceiver, a power amp module (PAM), a frequency filter, a low noise amplifier (LNA), an antenna, etc. According to another embodiment, at least one of the following modules: cellular module 421, WiFi module 423, BT module 425, GNSS module 427, and NFC module 428 is capable of transmission/reception of RF signals through a separate RF module. The SIM module 424 is capable of including a card including a subscriber identification module (SIM) and/or an embodied SIM. The SIM module 424 is also capable of containing unique identification information, e.g., integrated circuit card identifier (ICCID), or subscriber information, e.g., international mobile subscriber identity (IMSI).

The memory 430 (e.g., memory 330 shown in FIG. 3) is capable of including a built-in memory 432 or an external memory 434. The built-in memory 432 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc. The external memory 434 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 434 is capable of being connected to the electronic device 401, functionally and/or physically, through various interfaces.

The sensor module 440 is capable of measuring/detecting a physical quantity or an operation state of the electronic device 401, and converting the measured or detected information into an electronic signal. The sensor module 440 is capable of including at least one of the following: a gesture sensor 440A, a gyro sensor 440B, an atmospheric pressure sensor 440C, a magnetic sensor 440D, an acceleration sensor 440E, a grip sensor 440F, a proximity sensor 440G, a color sensor 440H (e.g., a red, green and blue (RGB) sensor), a biometric sensor 440I, a temperature/humidity sensor 440J, an illuminance sensor 440K, and a ultraviolet (UV) sensor 440M. Additionally or alternatively, the sensor module 440 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 440 is capable of further including a control circuit for controlling one or more sensors included therein. In embodiments, the electronic device 401 is capable of including a processor, configured as part of the processor 410 or a separate component, for controlling the sensor module 440. In this case, while the processor 410 is operating in sleep mode, the processor is capable of controlling the sensor module 440.

The input device 450 is capable of including a touch panel 452, a (digital) pen sensor 454, a key 456, or an ultrasonic input unit 458. The touch panel 452 may be implemented with at least one of the following: a capacitive touch system, a resistive touch system, an infrared touch system, and an ultrasonic touch system. The touch panel 452 may further include a control circuit. The touch panel 452 may also further include a tactile layer to provide a tactile response to the user. The (digital) pen sensor 454 may be implemented with a part of the touch panel or with a separate recognition sheet. The key 456 may include a physical button, an optical key, or a keypad. The ultrasonic input unit 458 is capable of detecting ultrasonic waves, created in an input tool, through a microphone 488, and identifying data corresponding to the detected ultrasonic waves.

The display 460 (e.g., the display 360 shown in FIG. 3) is capable of including a panel 462, a hologram unit 464, or a projector 466. The panel 462 may include the same or similar configurations as the display 360 shown in FIG. 3. The panel 462 may be implemented to be flexible, transparent, or wearable. The panel 462 may also be incorporated into one module together with the touch panel 452. The hologram unit 464 is capable of showing a stereoscopic image in the air by using light interference. The projector 466 is capable of displaying an image by projecting light onto a screen. The screen may be located inside or outside of the electronic device 401. According to an embodiment, the display 460 may further include a control circuit for controlling the panel 462, the hologram unit 464, or the projector 466. The interface 470 is capable of including a high-definition multimedia interface (HDMI) 472, a universal serial bus (USB) 474, an optical interface 476, or a D-subminiature (D-sub) 478. The interface 470 may be included in the communication interface 370 shown in FIG. 3. Additionally or alternatively, the interface 470 is capable of including a mobile high-definition link (MHL) interface, a secure digital (SD) card/multimedia card (MMC) interface, or an infrared data association (IrDA) standard interface.

The audio module 480 is capable of providing bidirectional conversion between a sound and an electronic signal. At least part of the components in the audio module 480 may be included in the input/output interface 350 shown in FIG. 3. The audio module 480 is capable of processing sound information input or output through a speaker 482, a receiver 484, earphones 486, microphone 488, etc. The camera module 491 refers to a device capable of taking both still and moving images. According to an embodiment, the camera module 491 is capable of including one or more image sensors (e.g., a front image sensor or a rear image sensor), a lens, an image signal processor (ISP), a flash (e.g., an LED or xenon lamp), etc. The power management module 495 is capable of managing power of the electronic device 401. According to an embodiment, the power management module 495 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 496. The battery 496 takes the form of either a rechargeable battery or a solar battery.

The indicator 497 is capable of displaying a specific status of the electronic device 401 or a part thereof (e.g., the processor 410), e.g., a boot-up status, a message status, a charging status, etc. The motor 498 is capable of converting an electrical signal into mechanical vibrations, such as, a vibration effect, a haptic effect, etc. Although not shown, the electronic device 401 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 5:
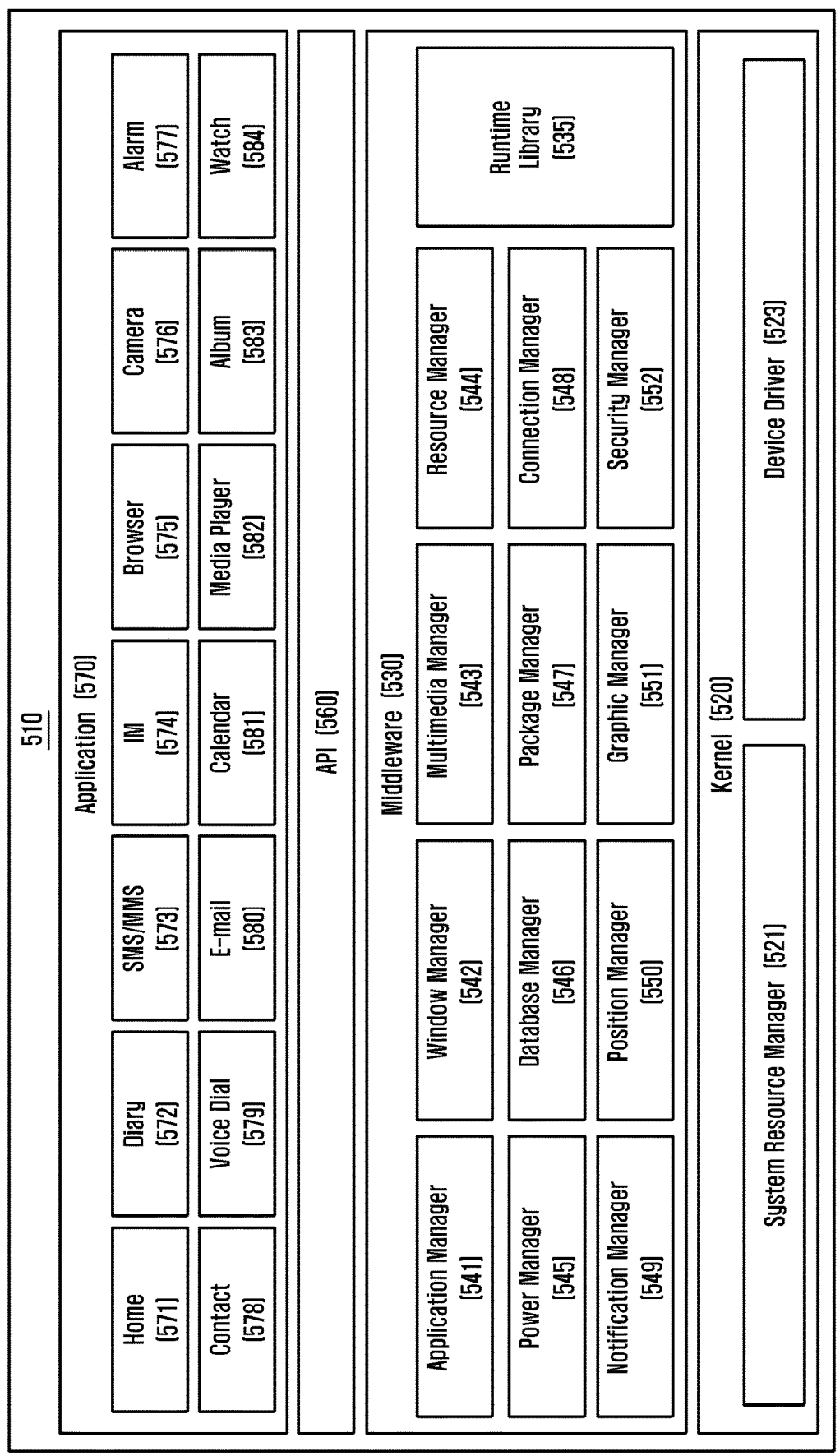
FIG. 5 is a block diagram of a program module according to various embodiments of the disclosure.

FIG. 5 is a block diagram of a programming module according to various embodiments. According to an embodiment, the program module 510 (e.g., program module 340 shown in FIG. 3) is capable of including an operation system (OS) for controlling resources related to the electronic device (e.g., electronic device 301) and/or various applications (e.g., application programs 347 shown in FIG. 3) running on the OS. The OS may be Android, iOS, Windows, Symbian, Tizen, Bada, etc. The program module 510 is capable of including a kernel 520, middleware 530, application programming interface (API) 560 and/or applications 570. At least part of the program module 510 may be preloaded on the electronic device or downloaded from a server (e.g., an electronic device 302 or 304, server 306, etc.).

The kernel 520 (for example, kernel 341) may include a system resource manager 521 and/or a device driver 523. The system resource manager 521 may include, for example, a process manager, a memory manager, and a file system manager. The system resource manager 521 may perform a system resource control, allocation, and recall. The device driver 523 may include, for example, a display driver, a camera driver, a Bluetooth driver, a shared memory driver, a USB driver, a keypad driver, a WiFi driver, and an audio driver. Further, according to an embodiment, the device driver 523 may include an Inter-Process Communication (IPC) driver. The middleware 530 may provide a function required in common by the applications 570. Further, the middleware 530 may provide a function through the API 560 to allow the applications 570 to efficiently use limited system resources within the electronic device. According to an embodiment, the middleware 530 (for example, the middleware 343) may include at least one of a runtime library 535, an application manager 541, a window manager 542, a multimedia manager 543, a resource manager 544, a power manager 545, a database manager 546, a package manager 547, a connection manager 548, a notification manager 549, a location manager 550, a graphic manager 551, and a security manager 552.

The runtime library 535 may include, for example, a library module used by a complier to add a new function through a programming language while the applications 570 are executed. According to an embodiment, the runtime library 535 executes input and output, management of a memory, a function associated with an arithmetic function and the like. The application manager 541 may manage, for example, a life cycle of at least one of the applications 570. The window manager 542 may manage GUI resources used on the screen. The multimedia manager 543 may detect a format required for reproducing various media files and perform an encoding or a decoding of a media file by using a codec suitable for the corresponding format. The resource manager 544 manages resources such as a source code, a memory, or a storage space of at least one of the applications 570. The power manager 545 may operate together with a Basic Input/Output System (BIOS) to manage a battery or power and provides power information required for the operation. The database manager 546 may manage generation, search, and change of a database to be used by at least one of the applications 570. The package manager 547 may manage an installation or an update of an application distributed in a form of a package file.

The connection manager 548 may manage, for example, a wireless connection such as WiFi or Bluetooth. The notification manager 549 may display or notify a user of an event such as an arrival message, an appointment, a proximity alarm or the like, in a manner that does not disturb the user. The location manager 550 may manage location information of the electronic device. The graphic manager 551 may manage a graphic effect provided to the user or a user interface related to the graphic effect. The security manager 552 provides a general security function required for a system security or a user authentication. According to an embodiment, when the electronic device (for example, the electronic device 301) has a call function, the middleware 530 may further include a telephony manager for managing a voice of the electronic device or a video call function. The middleware 530 is capable of including modules configuring various combinations of functions of the above described components. The middleware 530 is capable of providing modules specialized according to types of operation systems to provide distinct functions. The middleware 530 may be adaptively configured in such a way as to remove part of the existing components or to include new components. The API 560 (for example, API 345) may be a set of API programming functions, and may be provided with a different configuration according to an operating system. For example, in Android or iOS, a single API set may be provided for each platform. In Tizen, two or more API sets may be provided.

The applications 570 (e.g., application programs 347) may include one or more applications for performing various functions, e.g., home 571, diary 572, SMS/MMS 573, instant message (IM) 574, browser 575, camera 576, alarm 577, contact 578, voice dial 579, email 580, calendar 581, media player 582, album 583, clock 584, health care (e.g., an application for measuring amount of exercise, blood sugar level, etc.), and environment information (e.g., an application for providing atmospheric pressure, humidity, temperature, etc.). According to an embodiment, the applications 570 are capable of including an application for supporting information exchange between an electronic device (e.g., electronic device 301) and an external device (e.g., electronic devices 302 and 304), which is hereafter called 'information exchange application'). The information exchange application is capable of including a notification relay application for relaying specific information to external devices or a device management application for managing external devices. For example, the notification relay application is capable of including a function for relaying notification information, created in other applications of the electronic device (e.g., SMS/MMS application, email application, health care application, environment information application, etc.) to external devices (e.g., electronic devices 302 and 304). In addition, the notification relay application is capable of receiving notification information from external devices to provide the received information to the user. The device management application is capable of managing (e.g., installing, removing or updating) at least one function of an external device (e.g., electronic devices 302 and 304) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc. According to an embodiment, the applications 570 are capable of including an application (e.g., a health care application of a mobile medical device, etc.) specified attributes of an external device (e.g., electronic devices 302 and 304). According to an embodiment, the applications 570 are capable of including applications received from an external device (e.g., a server 306, electronic devices 302 and 304). According to an embodiment, the applications 570 are capable of including a preloaded application or third party applications that can be downloaded from a server. It should be understood that the components of the program module 510 may be called different names according to types of operating systems. According to various embodiments, at least part of the program module 510 can be implemented with software, firmware, hardware, or any combination of two or more of them. At least part of the program module 510 can be implemented (e.g., executed) by a processor (e.g., processor 410). At least part of the programing module 510 may include modules, programs, routines, sets of instructions or processes, etc., in order to perform one or more functions.

The term "module" as used herein may include a unit consisting of hardware, software, or firmware, and may, for example, be used interchangeably with the term "logic", "logical block", "component", "circuit", or the like. The "module" may be an integrated component or a minimum unit for performing one or more functions or a part thereof. The "module" may be implemented mechanically or electronically, and may include, for example, an Application-Specific Integrated Circuit (ASIC) chip, a Field-Programmable Gate Array (FPGA), or a programmable logic device, which is known or is to be developed in the future, for performing certain operations. At least some of devices (e.g., modules or functions thereof) or methods (e.g., operations) according to various embodiments may be implemented as instructions which are stored a computer-readable storage medium (e.g., the memory 330) in the form of a program module. If the instructions are executed by a processor, the processor may perform a function corresponding to the instructions. The computer-readable storage medium may include a hard disk, a floppy disk, a magnetic medium (e.g., a magnetic tape), optical media (e.g., CD-ROM, DVD), magneto-optical media (e.g., a floptical disk), internal memory, etc. The instructions may include code compiled by a complier or code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 6:
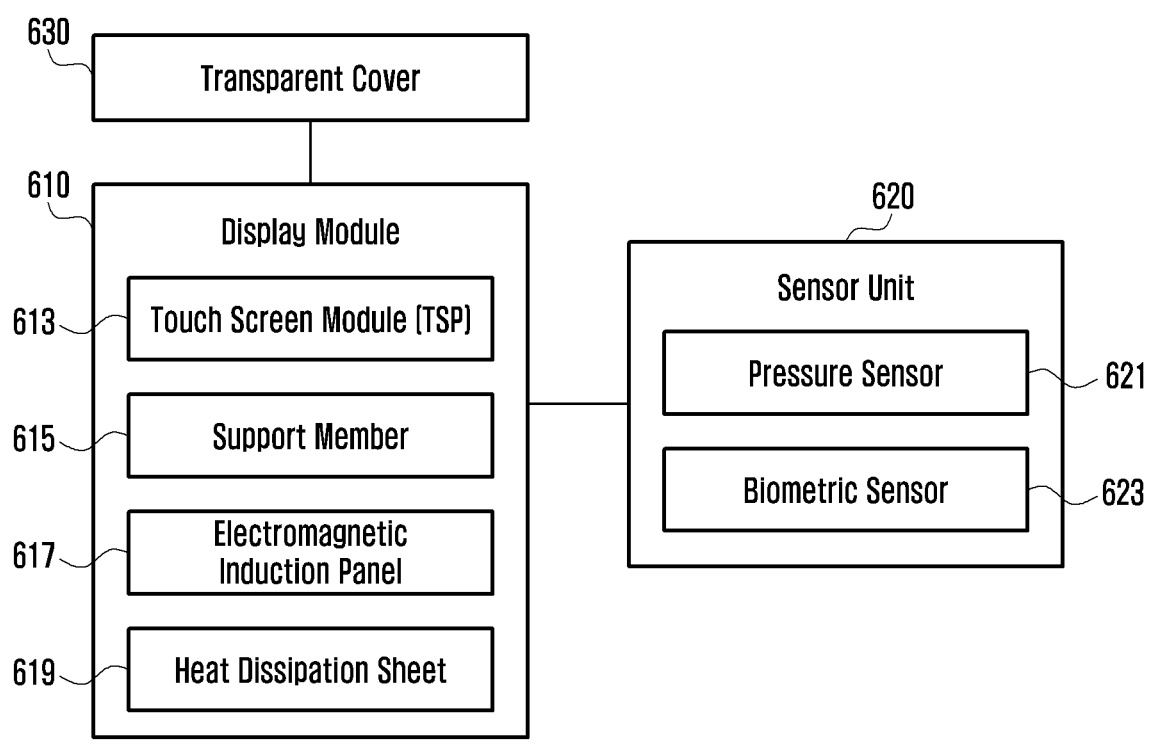
FIG. 6 is a block diagram of a display module and a sensor unit that constitute a screen of an electronic device according to various embodiments of the disclosure.

FIG. 6 is a block diagram of a display module and a sensor unit that constitute a screen of an electronic device according to various embodiments of the disclosure.

Referring to FIG. 6, an electronic device (e.g., the electronic device 301 in FIG. 3) may include a display module 610 (e.g., the display module 360 in FIG. 3), a sensor unit 620, and a transparent cover 630. The electronic device may display a screen on the basis of the display module 610, the sensor unit 620, and the transparent cover 630.

The display module 610 may include multiple panels (e.g., a touch screen panel 613, a support member 615, an electromagnetic induction panel 617, and a heat dissipation sheet 619), from which at least one component (e.g., the electromagnetic induction panel 617) may be omitted.

The display module 610 may display a screen or may receive a user's touch input or a stylus pen input on the basis of the multiple panels.

According to various embodiments, the transparent cover 630 may be disposed above the display module 610 to protect the display module 610 from an impact applied from the outside. According to various embodiments, the display module 610 may include a sensor unit 620.

The transparent cover 630 (e.g., the transparent cover 210 in FIG. 2) is a panel for preventing the touch screen panel 613 from being damaged, and may be disposed in front of the touch screen panel 613. The transparent cover 630 and the touch screen panel 613 may be bonded to each other by a transparent adhesive member.

A touch screen panel (TSP) 613 (e.g., the touch screen panel 220 in FIG. 2) may receive a user's touch input or may display a screen. The touch screen panel 613 may include a display for displaying a screen. The touchscreen panel 613 may receive the touch input using at least one of an electrostatic manner, a pressure-sensitive manner, an infrared manner, or an ultrasonic manner. The touch screen panel 613 may be a display including a touch sensor.

The support member 615 (e.g., the support member 230 in FIG. 2) is a protective member for protecting the touch screen panel, and may include an embossed sheet, a cushion sheet, and/or a black layer. For example, the black layer may block or reflect light emitted from the display and directed to the lower portion of the display. For example, the black layer may be formed integrally with the embossed sheet, and/or the cushion sheet. According to various embodiments, the embossed sheet of the support member 615 may be disposed under the touch screen panel 613 to protect the touch screen panel 613. According to various embodiments, the embossed sheet and the cushion sheet of the support member 615 may be spaced apart from each other.

The electromagnetic induction panel 617 (e.g., the electromagnetic induction panel 240 or digitizer in FIG. 2) may detect a stylus pen input to receive the stylus pen input. The electromagnetic induction panel 617 may be composed of a flexible printed circuit board and a shielding sheet. The shielding sheet is capable of preventing interference between the components included in the electronic device 100 (e.g., the display module, the printed circuit board, and the electromagnetic induction panel), in which the interference is caused due to electromagnetic fields generated from the components. By blocking the electromagnetic field generated from the components, the shielding sheet is capable of causing a stylus pen input to be accurately transferred to a coil included in the electromagnetic induction panel 617. According to various embodiments, the electromagnetic induction panel 617 may be omitted. According to various embodiments, the electromagnetic induction panel 617 may be omitted from the electronic device, and the electronic device may include the touch screen panel 613, the support member 615, and the heat dissipation sheet 619. The heat dissipation sheet 619 (e.g., the heat dissipation sheet 250 in FIG. 2) is able to limit the temperature rise inside the electronic device 100 by dissipating heat generated inside the electronic device 100. The heat dissipation sheet 619 may include a graphite (Gr) sheet and/or a copper (Cu) sheet, and may be disposed under the electromagnetic induction panel 617. The disposed position of the heat dissipation sheet 619 may be varied, and may be disposed above or below the support member. The heat dissipation sheet 619 according to various embodiments may include an opening formed in at least the partial area corresponding to the biometric sensor integrated in the electronic device 100.

Referring to FIG. 6, the display module 610 and the sensor unit 620 are separately illustrated. However, the sensor unit 620 may be incorporated in the display module 610, or may be disposed inside the display module 610. The sensor unit 620 may include a pressure sensor 621 and a biometric sensor 623.

The pressure sensor 621 is able to detect the pressure corresponding to a user input, and the biometric sensor 623 may detect the user's biometric information. According to various embodiments, the pressure sensor 621 may be disposed under the heat dissipation sheet 619. According to various embodiments, the pressure sensor 621 may be electrically connected to the touch screen panel 613, and may be disposed between a printed circuit board (PCB) (e.g., a flexible printed circuit board (FPCB)) disposed under the heat dissipation sheet 619 and the heat dissipation sheet 619. The PCB may be flexible or rigid.

The biometric sensor 623 may include a fingerprint sensor, and may acquire the user's fingerprint information corresponding to the user's touch input. The biometric sensor 623 may be disposed under the touch screen panel 613, and may acquire fingerprint information corresponding to the user's touch input. An empty space (e.g., an air gap) may be formed between the touch screen panel 613 and the biometric sensor 623 in order to acquire fingerprint information. In order to form the empty space, the panels disposed between the touch screen panel 613 and the biometric sensor 623 (e.g., the support member 615 and the electromagnetic induction panel 617) may include an opening corresponding to the size of the fingerprint detection area of the biometric sensor 623. A PCB (e.g., an FPCB) may be disposed under the biometric sensor 623, and the PCB may be a reinforcement plate for protecting the biometric sensor 623. The PCB may be flexible or rigid.

According to various embodiments, when the touch screen panel 613 and the pressure sensor 621 are driven by the same detection method (e.g., in the electrostatic manner), the touch screen panel 613 and the pressure sensor 621 may be configured as a single component. For example, the touch screen panel 613 and the pressure sensor 621 may be configured as a single integrated module. For example, the touch screen panel 613 and the pressure sensor 621 may both be driven by one driving circuit. Referring to FIG. 6, the touch screen panel 613 and the pressure sensor 621 are individually illustrated but are not limited thereto.

Figure 7B:
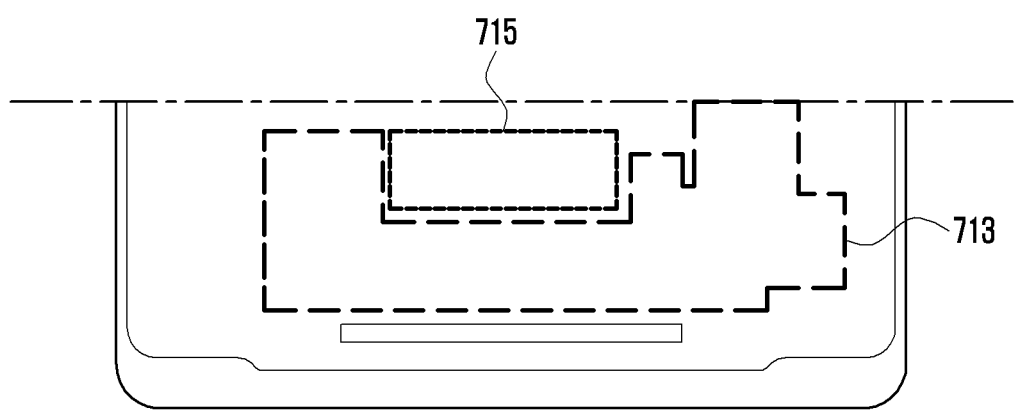
FIG. 7B is a cross-sectional view of an electronic device corresponding to a stacked structure of multiple panels constituting an electronic device according to various embodiments of the disclosure.
Figure 7C:
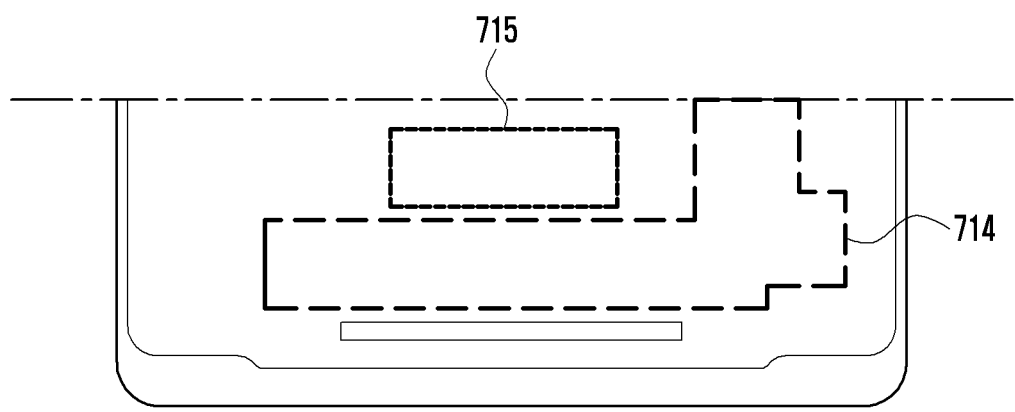
FIG. 7C is a cross-sectional view of an electronic device corresponding to a stacked structure of multiple panels constituting an electronic device according to various embodiments of the disclosure.

FIGS. 7A to 7C are cross-sectional views of an electronic device corresponding to a stacked structure of multiple panels constituting an electronic device according to various embodiments of the disclosure.

FIG. 7A is a view illustrating a cross-sectional view of the electronic device 100 illustrated in FIG. 2, which is taken along a transversal cross section (e.g., the transversal cross section 201 in FIG. 2).

Referring to FIG. 7A, the electronic device may include a display module (e.g., the display module 610 in FIG. 6) in which a transparent cover 701 (e.g., the transparent cover 630 in FIG. 6) and multiple panels are stacked. The transparent cover 701 may be disposed above the display module so as to protect the display module from an external impact.

The transparent cover 701 is a panel, which is directly touched by a user input, and may protect the touch screen panel 703 (e.g., the touch screen panel 613 of FIG. 6) included in the display module. The touch screen panel 703 may detect the user's touch input, or may display a screen. Since the touch screen panel 703 may be damaged by the user input, the touch screen panel may be protected by the transparent cover 701 on the top thereof. The touch screen panel 703 may be protected by the support member 705 (e.g., the support member 615 in FIG. 6) on the bottom thereof.

The support member 705 may include an embossed sheet and/or a cushion sheet, and may protect the touch screen panel 703 and the electromagnetic induction panel 707 (e.g., the electromagnetic induction panel 617 in FIG. 6). The electromagnetic induction panel 707 includes an FPCB and a shielding sheet, and is able to detect a user input corresponding to a stylus pen. According to various embodiments, the electromagnetic induction panel 707 may be omitted. The heat dissipation sheet 709 (e.g., the heat dissipation sheet 619 in FIG. 6) is able to limit the temperature rise inside the electronic device by dissipating heat. The heat dissipation sheet 709 may include a graphite (Gr) sheet and/or a copper (Cu) sheet, and may be disposed under the electromagnetic induction panel 707. The disposed position of the heat dissipation sheet 709 may be varied, and may be disposed above or below the support member. The heat dissipation sheet 709 according to various embodiments may include an opening formed in at least the partial area corresponding to the biometric sensor integrated in the electronic device 100. Each of the support member 705, the electromagnetic induction panel 707, and the heat-radiating sheet 709 according to the various embodiments may have an opening (e.g., a first opening) formed in at least a partial area thereof to correspond to the size of the fingerprint detection area 731 of the biometric sensor 730 mounted in the electronic device. The first opening included in each of the panels may implement a first space (an air gap) 740.

According to various embodiments, in the electronic device, the biometric sensor 730 (e.g., the biometric sensor 621 in FIG. 6) may be incorporated in the structure in which the multiple panels are stacked. For example, the biometric sensor 730 may be disposed under the touch screen panel 703, and may acquire the user's fingerprint information corresponding to the user's touch input. A first space 740 (e.g., an air gap) may be formed between the touch screen panel 703 and the biometric sensor 730 in order to acquire the fingerprint information through the biometric sensor 730. In detail, the biometric sensor 730 may include a fingerprint detection area 731 for acquiring fingerprint information, and the electronic device may have the first space 740 corresponding to the size of the fingerprint detection area 731. Each of the panels (e.g., the support member 705, the electromagnetic induction panel 707, and the heat dissipation sheet 709) disposed between the touch screen panel 703 and the biometric sensor 730 may include a first opening corresponding to the size of the fingerprint detection area 731. The first space 740 may be formed on the basis of the first opening included in each of the panels (e.g., the support member 705, the electromagnetic induction panel 707, and the heat dissipation sheet 709), and may be a sealed space that is blocked from the outside. Since the biometric sensor 730 according to various embodiments is to be attached on the basis of a partial area of each of the upper panels, various types of adhesive tape or various types of attachment methods may be used. A transparent adhesive member may be disposed above the biometric sensor 730.

According to various embodiments, since the biometric sensor 730 is attached to the upper panel in the electronic device, it is possible to minimize the distance 720 between the fingerprint detection area 731 and a point to be touched by the user's touch input. It is possible to increase the fingerprint recognition rate of the user's fingerprint by the electronic device due to the minimized distance 720.

According to various embodiments, the electronic device may have a pressure sensor 711 (e.g., the pressure sensor 621 in FIG. 6) disposed below the heat spreader sheet 709 so as to detect the pressure corresponding to the user input.

According to various embodiments, the electronic device may include a first FPCB 715 (e.g., a first PCB) disposed below the biometric sensor 730, and a second FPCB 713 (e.g., a second PCB) disposed below the pressure sensor 711. In the electronic device, by disposing the first FPCB 715 below the biometric sensor 730, it is possible to protect the biometric sensor 730 more safely. According to various embodiments, the pressure sensor 711 may include an opening (e.g., a second opening) at least in a partial area corresponding to the size of the biometric sensor 730 such that the biometric sensor 730 is disposed between the multiple panels. The second FPCB 713 may include an opening in the form of a hole in at least a partial area thereof to correspond to the size of the biometric sensor 730, or may be formed in the form of a hole. The second FPCB 713 may be configured to include a space corresponding to the size of the biometric sensor 730 such that the biometric sensor 730 can be disposed therein. A second space (an air gap) 750 may be implemented on the basis of the opening included in the pressure sensor 711 and the opening included in the second FPCB 713.

The first FPCB 715 may include at least one terminal exposed to the outside and electrically connectable to the second FPCB 713, and may be connected to the second FPCB 713 through the terminal. According to various embodiments, a connector electrically connectable to the second FPCB 713 may be mounted on a partial area of the first FPCB 715. According to various embodiments, a connector electrically connectable to the first FPCB 715 may be mounted on a partial area of the second FPCB 713. Particularly, in the electronic device, it is possible to protect the biometric sensor 730 more safely by differently setting a distance a between the second FPCB 713 and a body 717 (e.g., a bracket) and a distance b between the first FPCB 715 and the body 717. For example, in order to perform a user authentication function, when a user's touch input occurs, a pressure may be applied in the area in which the biometric sensor 730 is disposed. According to various embodiments, in the electronic device, since the distance b is set to be longer than the distance a, it is possible to protect the biometric sensor 730 from a pushed phenomenon corresponding to the user's touch input. According to various embodiments, the pressure sensor 711 may have an opening disposed in at least a partial area to correspond to the biometric sensor 730 mounted in the electronic device. According to various embodiments, the second FPCB 713 may be formed in various structures on the basis of the size of the biometric sensor 730. FIGS. 7B and 7C below illustrate plan views of the first FPCB 715 and the second FPCB board 713, which are cut along a cutting line 721.

FIGS. 7B and 7C are plan views of the first FPCB and the second FPCB according to various embodiments of the disclosure.

FIGS. 7B and 7C illustrate plan views of the electronic device cut along the cutting line 721 in FIG. 7A. FIGS. 7B and 7C illustrate plan views corresponding to the lower portion of the electronic device, but the disclosure is limited thereto.

Referring to FIG. 7B, the first FPCB 715 may be in contact with the second FPCB 713 in three faces thereof. The second FPCB 713 may be manufactured in the form of being in contact with the first FPCB 715 in three faces thereof. For example, the second FPCB 713 may be configured to surround the first FPCB 715.

Referring to FIG. 7C, the first FPCB 715 may be in contact with the second FPCB 714 in at least one face thereof. The second FPCB 714 may be manufactured in the form of being in contact with the first FPCB 715 in one face thereof. For example, the second FPCB 714 may be in the form of being in contact with the lower face of the first FPCB 715.

According to various embodiments, the FPCB may be described as a PCB, and the PCB may be flexible or rigid.

FIG. 8 is a cross-sectional view of an electronic device illustrating a stacked structure of multiple panels included in an electronic device according to various embodiments of the disclosure on the basis of a longitudinal section.

FIG. 8 is a view illustrating a cross-sectional view of the electronic device 100 illustrated in FIG. 2, which is taken along a longitudinal cross section (e.g., the longitudinal cross section 203 in FIG. 2). Referring to FIG. 8, the components illustrated in FIG. 8 may correspond to the components illustrated in FIG. 7A. In the electronic device according to various embodiments, the biometric sensor 730 may be attached to a panel disposed thereon. In order to attach the biometric sensor 730 to the electronic device, a transparent adhesive member 735 may be disposed on the upper face of the biometric sensor 730. According to various embodiments, the transparent adhesive member 735 may be disposed on the remaining portion of the electronic device other than the fingerprint detection area 730, or a transparent adhesive member 735 may be disposed so as to cover the entire biometric sensor 730.

Figure 9A:
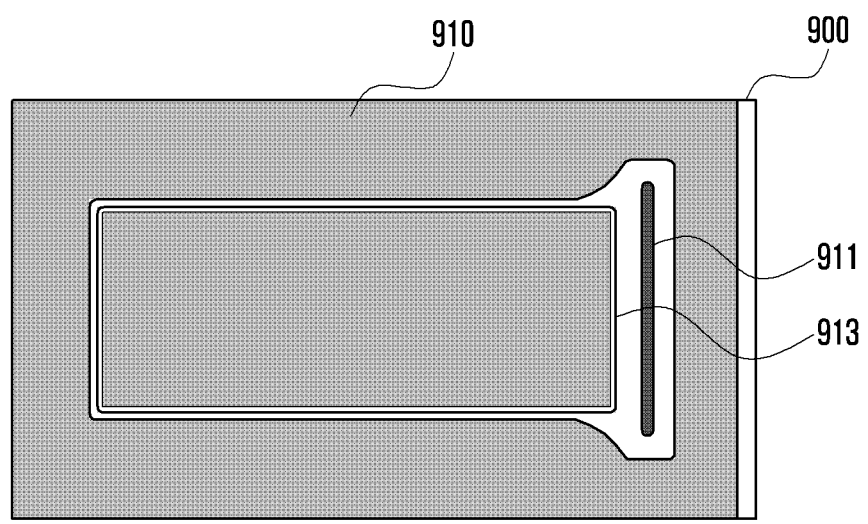
FIG. 9A is a view illustrating an embodiment of applying a transparent adhesive member to the upper portion of a biometric sensor according to various embodiments of the disclosure.
Figure 9B:
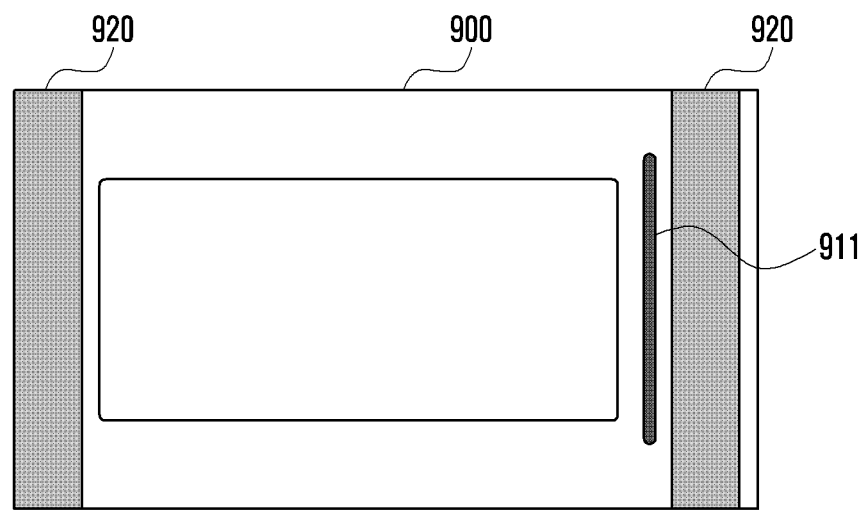
FIG. 9B is a view illustrating an embodiment of applying a transparent adhesive member to the upper portion of a biometric sensor according to various embodiments.
Figure 9C:
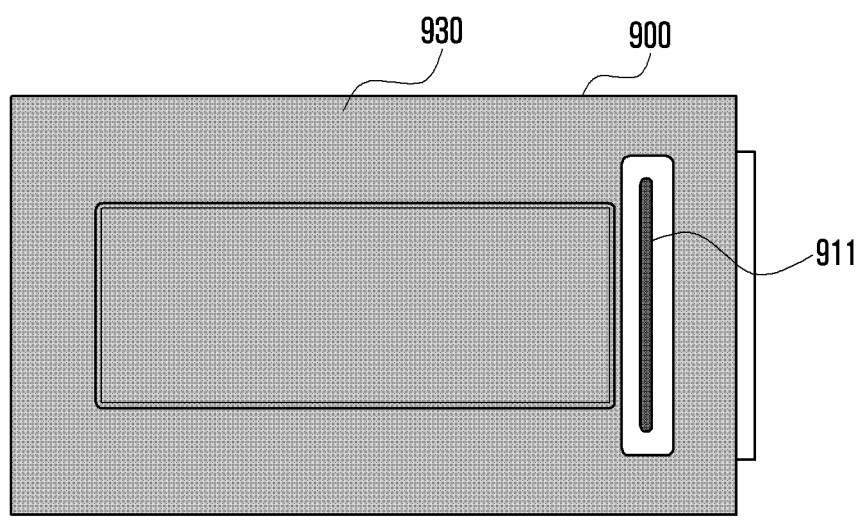
FIG. 9C is a view illustrating an embodiment of applying a transparent adhesive member to the upper portion of a biometric sensor according to various embodiments of the disclosure.

FIGS. 9A to 9C are views illustrating an embodiment of attaching a transparent adhesive member to the upper face of a biometric sensor according to various embodiments of the disclosure.

FIG. 9A illustrates the upper face of a biometric sensor 900 (e.g., the biometric sensor 730 in FIG. 7A). FIG. 9A may be a view obtained when the biometric sensor 900 is viewed from above. The biometric sensor 900 may include a fingerprint detection area 913 (e.g., a fingerprint detection area 731 in FIG. 7A) and a wire bonding area 911. The biometric sensor 900 according to various embodiments may include a transparent adhesive member disposed on the biometric sensor 900 such that the biometric sensor 900 is attached to the panel disposed thereon. Referring to FIG. 9A, the electronic device may include a transparent adhesive member disposed in a remaining area 910 other than the fingerprint detection area 913 and the wire bonding area 911.

Referring to FIG. 9B, the transparent adhesive member may be disposed in each of the opposite side areas 920 of the fingerprint detection area 913. The transparent adhesive member may be disposed in the side areas 920 other than the fingerprint detection area 913 and the wire bonding area 911.

Referring to FIG. 9C, the transparent bonding member may be disposed in the remaining area 930 other than only the wire bonding region 911. For example, the transparent adhesive member may be disposed corresponding to the overall area of the biometric sensor 900, other than the wire bonding area 911.

The transparent adhesive member attached to the upper face of the biometric sensor 900 may be a material that is easy to detect a stylus pen input. The transparent adhesive member may be coupled with the electromagnetic induction panel disposed on the upper portion of the biometric sensor 900 so as to detect a stylus pen input.

Figure 10:
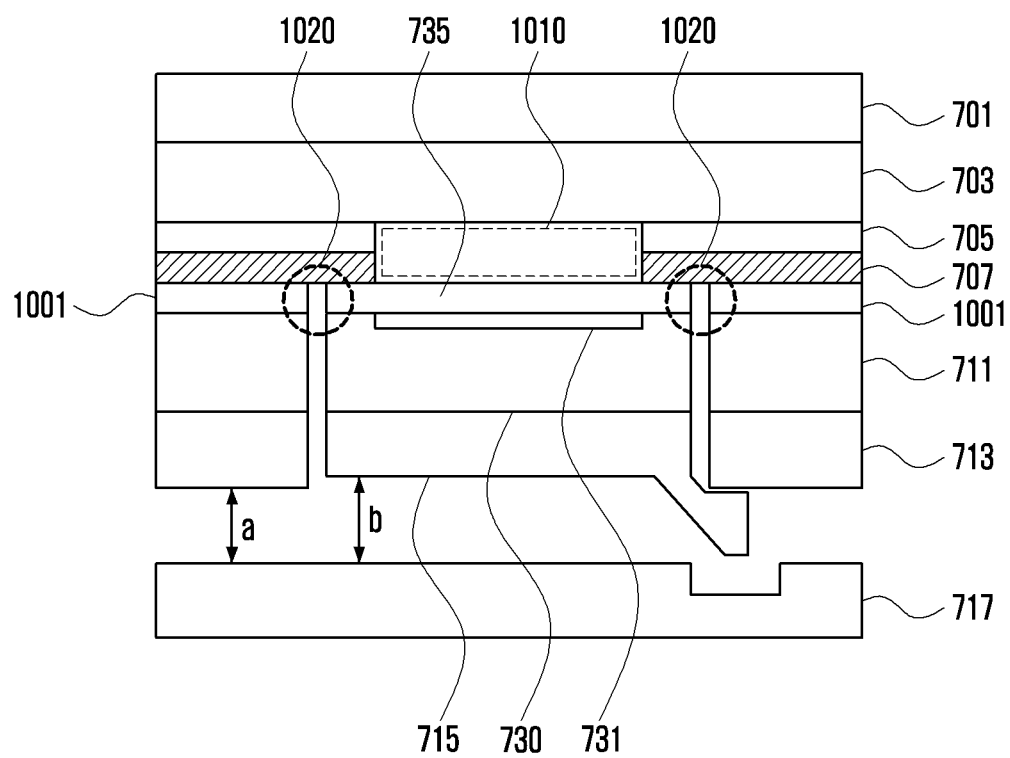
FIG. 10 is a view illustrating an embodiment in which a biometric sensor is disposed around a heat dissipation sheet including an opening corresponding to the size of the biometric sensor according to various embodiments of the disclosure.

FIG. 10 is a view illustrating an embodiment in which a biometric sensor is disposed around a heat dissipation sheet including an opening corresponding to the size of the biometric sensor according to various embodiments of the disclosure.

Referring to FIG. 10, each of the support member 705 and the electromagnetic induction panel 707 of the electronic device may include an opening (e.g., a first opening) corresponding to the size of the fingerprint detection area 731 of the biometric sensor 730. The opening included in the support member 705 and the opening included in the electromagnetic induction panel 707 may implement a first space (an air gap) 1010. The heat dissipation sheet 1001 according to various embodiments may include an opening (e.g., a second opening) corresponding to the size of the biometric sensor 730. The opening included in the heat dissipation sheet 1001 may be enlarged from the size corresponding to the fingerprint detection area 731 to the size corresponding to the biometric sensor 730 (1020). Referring to FIG. 10, each of the heat dissipation sheet 1001 and the pressure sensor 711 may include an opening (e.g., a second opening) corresponding to the size of the biometric sensor 730. The second FPCB 713 may be formed on the basis of the size of the biometric sensor 730 such that the biometric sensor 730 is disposed thereon. As the opening included in the heat dissipation sheet 1001 is enlarged, the biometric sensor 730 may be disposed closer to the transparent cover 701. The fingerprint recognition rate of the electronic device is able to be improved as the distance between the transparent cover 701 and the fingerprint detection area 731 touched by the user's touch input is decreased.

In the electronic device according to various embodiments, the distance b between the first FPCB 715 and the body 717 may be set to be longer than the distance a between the second FPCB 713 and the body 717. In the electronic device according to various embodiments, it is possible to prevent the biometric sensor 730 from being damage by the user's touch pressure by setting the distance b to be longer than the distance a.

Figure 11:
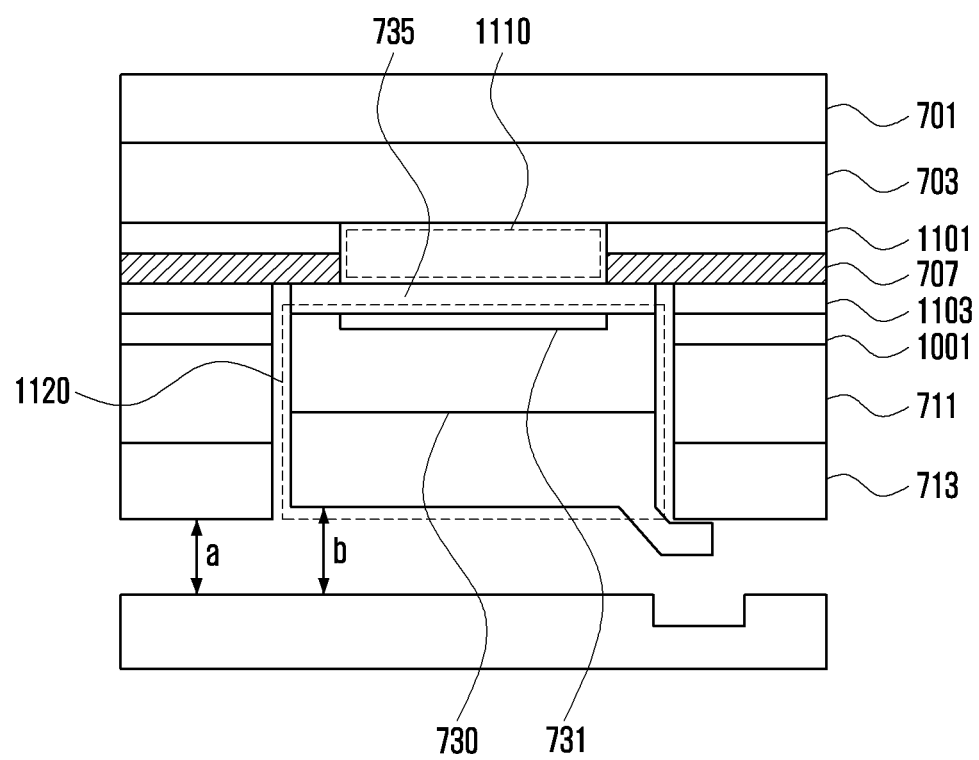
FIG. 11 is a view illustrating an embodiment of changing the disposed position of a cushion constituting a support member according to various embodiments of the disclosure and adjusting the size of an opening included in the cushion.

FIG. 11 is a view illustrating an embodiment of changing the disposed position of a cushion constituting a support member according to various embodiments of the disclosure and adjusting the size of an opening included in the cushion.

Referring to FIG. 11, in the electronic device, the embossed sheet 1101 and the cushion sheet 1103 constituting the support member may be disposed to be spaced apart from each other. The embossed sheet 1101 may be disposed between the touch screen panel 703 and the electromagnetic induction panel 707, and the cushion sheet 1103 may be disposed between the electromagnetic induction panel 703 and the heat radiation sheet 1001. Each of the embossed sheet 1101 and the electromagnetic induction panel 707 may include an opening (e.g., a first opening) corresponding to the size of the fingerprint detection area 731 of the biometric sensor 730. Each of the cushion sheet 1103, the heat dissipation sheet 1001, and the pressure sensor 711 may include an opening (e.g., a second opening) corresponding to the size of the biometric sensor 730. In the cushion sheet 1103, the opening may be adjusted in size from the first opening to the second opening. The distance between the transparent cover 701 and the biometric sensor 730 is capable of being reduced by disposing the cushion sheet 1103, which has been disposed above the biometric sensor 730, in the peripheral area of the biometric sensor 730.

In the electronic device according to various embodiments, the distance b between the first FPCB 715 and the body 717 may be set to be longer than the distance a between the second FPCB 713 and the body 717. In the electronic device according to various embodiments, it is possible to prevent the biometric sensor 730 from being damaged by the user's touch pressure by setting the distance b to be longer than the distance a.

Figure 12:
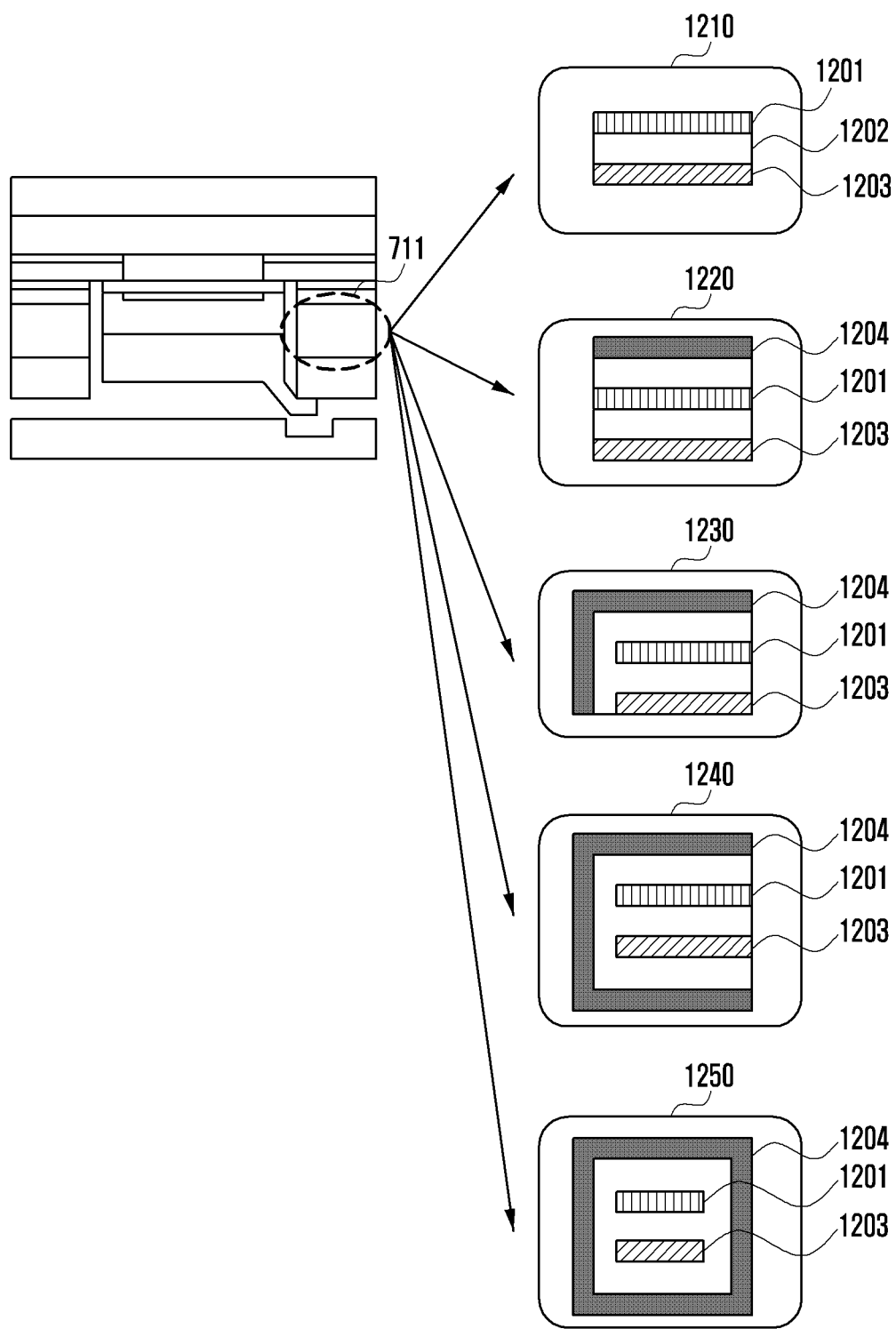
FIG. 12 is a view illustrating a pressure sensor to which a shield structure is added in order to reduce an interference effect on the pressure sensor according to various embodiments of the disclosure.

FIG. 12 is a view illustrating a pressure sensor to which a shield structure is added in order to reduce an interference effect on the pressure sensor according to various embodiments of the disclosure.

FIG. 12 illustrates various embodiments of the structure of the pressure sensor 711. The pressure sensor 711 may include a first electrode 1201, a dielectric layer 1202, and a second electrode 1203. The pressure sensor 711 may detect the pressure corresponding to a user input. For example, the pressure sensor 711 may measure a capacitance value formed between the first electrode 1201 and the second electrode 1203. When a user input is generated, the capacitance value formed between the first electrode 1201 and the second electrode 1203 may be changed. In general, as the distance between the first electrode 1201 and the second electrode 1203 becomes closer to each other due to the pressure, the capacitance value may be increased. The electronic device may detect the pressure corresponding to a user input on the basis of the amount of change in the capacitance value.

Referring to a first embodiment 1210, the pressure sensor 711 may include only the first electrode 1201, the dielectric layer 1202, and the second electrode 1203 without a shield electrode.

Referring to a second embodiment 1220, the pressure sensor 711 may be provided with a shield electrode 1204 on the basis of the upper face thereof. The second embodiment 1220 may block interference signals generated from components disposed on the first electrode 1201.

Referring to a third embodiment 1230, the pressure sensor 711 may be provided with a shield electrode 1204 on the basis of the upper face and one side face thereof.

Referring to a fourth embodiment 1240, the pressure sensor 711 may be provided with a shield electrode 1204 on the basis of the upper face, one side face, and the lower face thereof.

Referring to a fifth embodiment 1250, the pressure sensor 711 may be disposed so as to be entirely surrounded by a shield electrode 1204.

A shield electrode 1204 according to various embodiments may be disposed to enclose at least a portion of the periphery of a pressure sensor 711. The pressure sensor 711, to which the shield electrode 1204 is added, is able to minimize interference signals generated from the components disposed therearound, and is able to stably maintain the sensitivity of the pressure sensor. For example, by adding the shield electrode 1204 to the outer faces of the first electrode 1201 and the second electrode 1203 constituting the pressure sensor 711, the pressure sensor 711 is able to minimize the interference signals generated from components, such as a metal layer (e.g., Cu of a heat dissipation sheet) or a biometric sensor, disposed therearound. The shield electrode 1204 may be formed of the same material as the first electrode 1201 and/or the second electrode 1203.

Figure 13A:
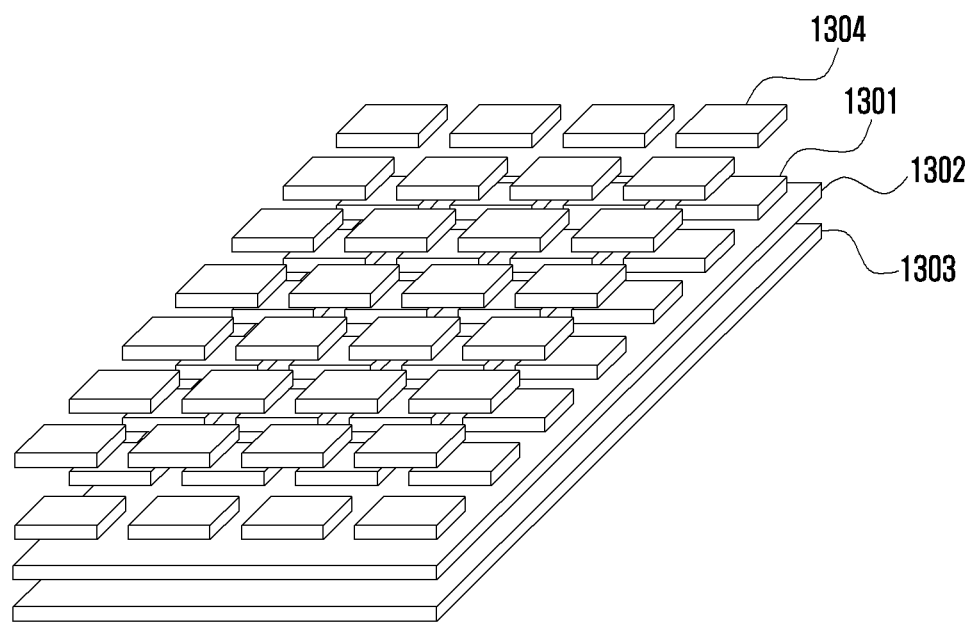
FIG. 13A is view illustrating an embodiment of differently configuring the structure of a pressure sensor according to various embodiments of the disclosure.
Figure 13B:
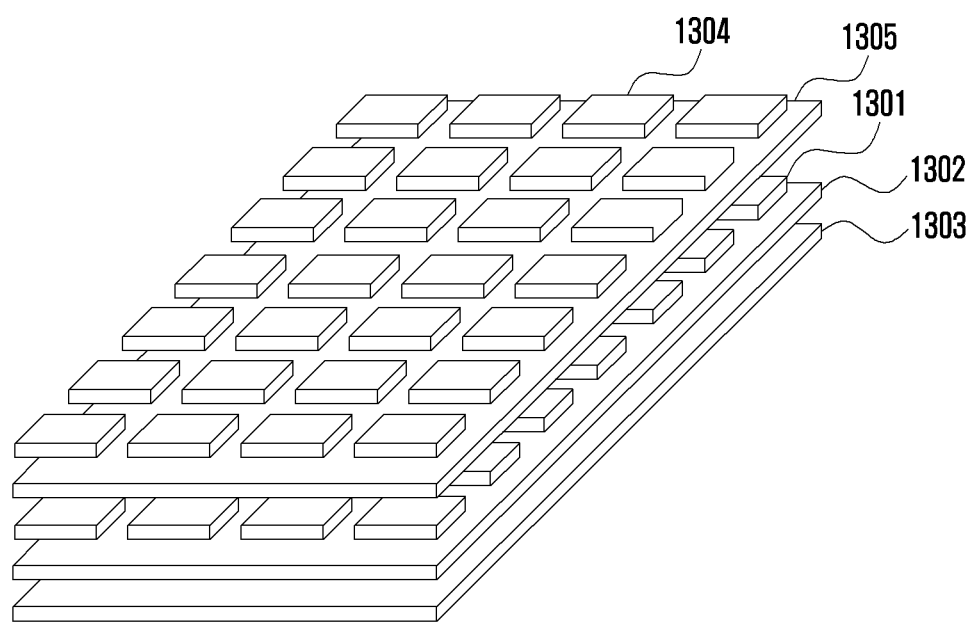
FIG. 13B is view illustrating an embodiment of differently configuring the structure of a pressure sensor according to various embodiments of the disclosure.
Figure 13C:
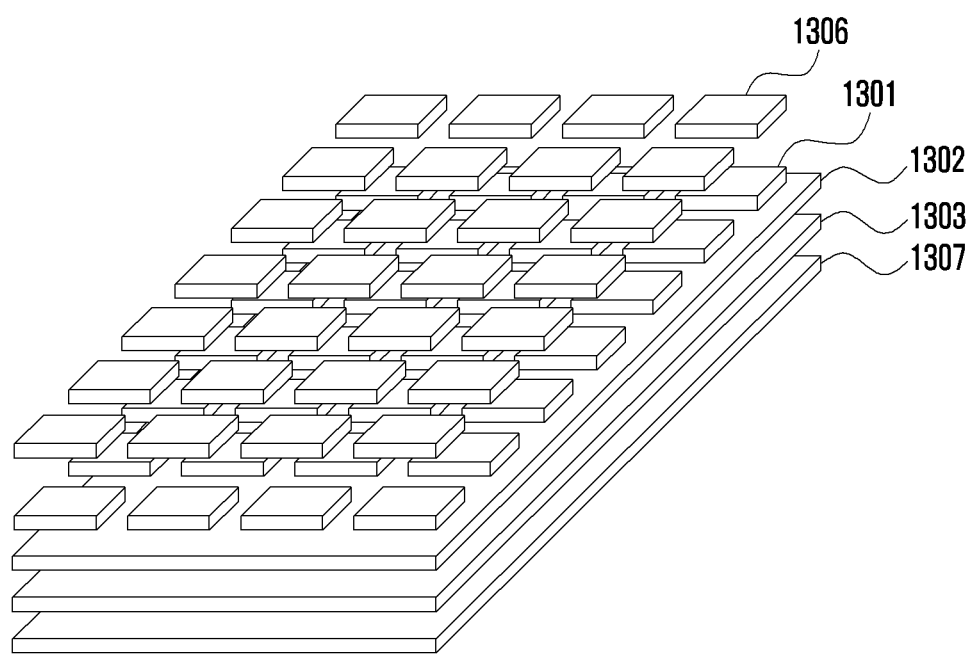
FIG. 13C is view illustrating an embodiment of differently configuring the structure of a pressure sensor according to various embodiments of the disclosure.

FIGS. 13A to 13C are views illustrating embodiments of differently configuring the structure of a pressure sensor according to various embodiments of the disclosure.

FIGS. 13A to 13C illustrate the cases where pressure sensors are disposed not only on a specific portion (e.g., a home key area) of the electronic device, but also on the entire screen of the electronic device. An electronic device according to various embodiments may include shield electrodes disposed on the entire area of the screen, corresponding to the pressure sensors disposed on the entire screen area.

Referring to FIG. 13A, a pressure sensor 711 includes a dielectric layer 1302 disposed between a first electrode 1301 and a second electrode 1303, and a shield electrode 1304 may be disposed on the first electrode 1301. Referring to FIG. 13A, the shield electrode 1304 and the first electrode 1301 may be formed in the same pattern. The shield electrode 1304 may be formed to have a size larger than that of the first electrode 1301. Referring to FIG. 13A, a first support member corresponding to the first electrode 1301 and a second support member corresponding to the shield electrode 1304 may be respectively formed. Alternatively, the first electrode 1301 and the shield electrode 1304 may be disposed on both sides (the upper face and the lower face) of one support member, respectively. The support member may be in the form of a single continuous film, and may be in a centrally bifurcated form in order to ensure the flexibility of the pressure sensor.

Referring to FIG. 13B, the pressure sensor 711 may include a support member 1305 disposed between the first electrode 1301 and the shield electrode 1304. For example, the electronic device may simultaneously drive the first electrode 1301 and the shield electrode 1304. In this case, interference from peripheral components may be reduced, compared to the case in which the first electrode 1301 and the shield electrode 1304 are not driven simultaneously. For example, in the electronic device, it is possible to calculate a fixed capacitance value on the basis of the first electrode 1301, the second electrode 1303, and the shield electrode 1304. Respective first electrodes 1301, respective second electrodes 1303, and respective shield electrodes 1304 may be driven simultaneously over the entire area, or the corresponding bundles thereof may be sequentially driven.

FIG. 13C illustrates an embodiment in the case in which the first electrodes 1301 and the first shield electrodes 1306 form multiple patterns, and each of the second electrodes 1303 and the second shield electrodes 1307 form a single pattern. Referring to FIG. 13C, the second electrode 1303 and the second shield electrode 1307 may be formed in the same pattern. Alternatively, the second shield electrode 1307 may have a pattern different from that of the second electrode 1303 (e.g., a pattern smaller than that of the second electrode 1303 (the entire conductive support member disposed under the pressure sensor 711)). The second electrode 1303 and the second shield electrode 1307 may be disposed on both sides of one support member, respectively.

Figure 14:
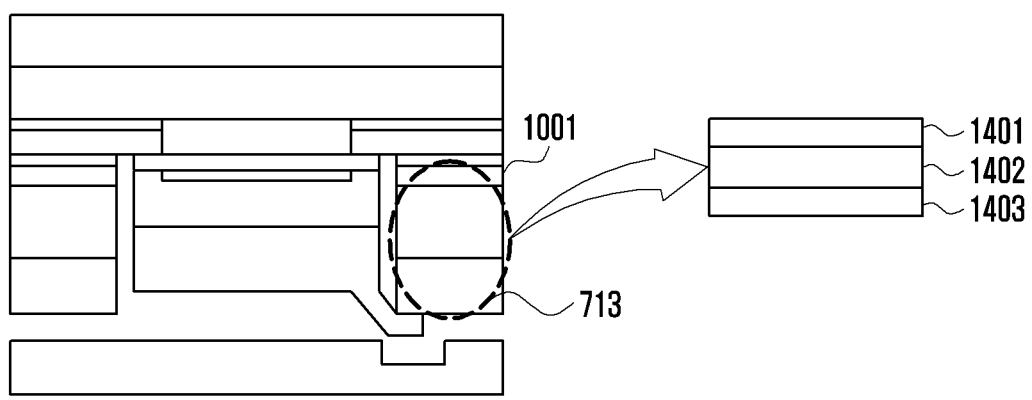
FIG. 14 is a view illustrating an embodiment in which a pressure sensor is constituted using different components according to various embodiments of the disclosure.

FIG. 14 is a view illustrating an embodiment in which a pressure sensor is constituted using different components according to various embodiments of the disclosure.

Referring to FIG. 14, instead of mounting a separate pressure sensor, a pressure sensor may be implemented by other surrounding components. For example, a copper sheet included in the heat dissipation sheet 1001 may be used as a first electrode 1401. In addition, a conductor on a second FPCB (the second FPCB 713 in FIG. 7A) may be arranged in the form of a sensor pattern so as to be utilized as a second electrode 1403. A dielectric layer 1402 may be disposed between the first electrode 1401 and the second electrode 1403. The thickness of the dielectric layer 1402 may be thicker than the dielectric layer included in a separate pressure sensor. Due to this, the elastic force and the restoring force of the dielectric layer 1402 may be increased. Referring to FIG. 14, since the pressure sensor is implemented using a part of other components, it is possible to reduce the manufacturing cost of the electronic device, and to minimize the thickness of the pressure sensor.

Figure 15A:
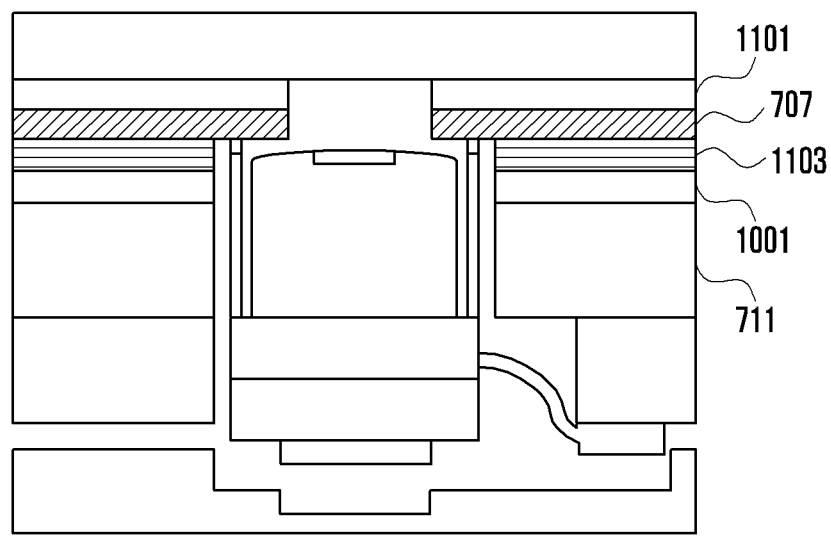
FIG. 15A is view illustrating an embodiment of variously disposing a cushion included in a support member according to various embodiments of the disclosure.
Figure 15B:
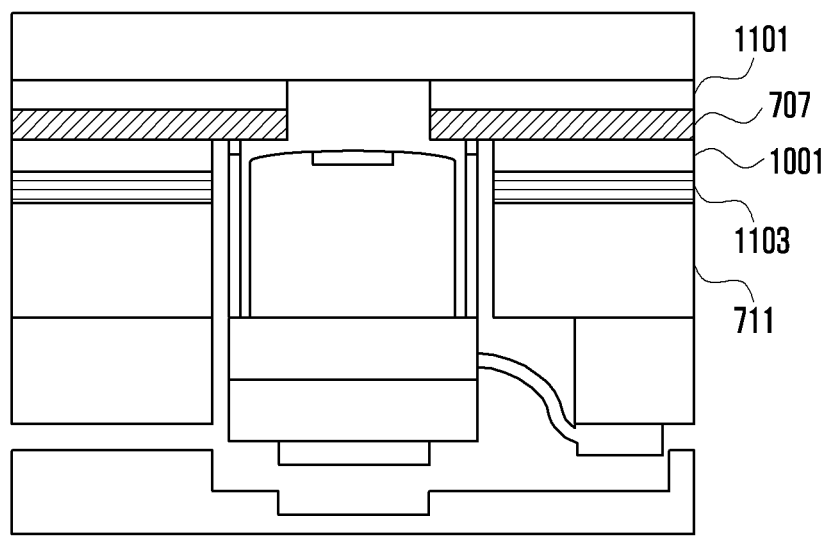
FIG. 15B is view illustrating an embodiment of variously disposing a cushion included in a support member according to various embodiments of the disclosure.
Figure 15C:
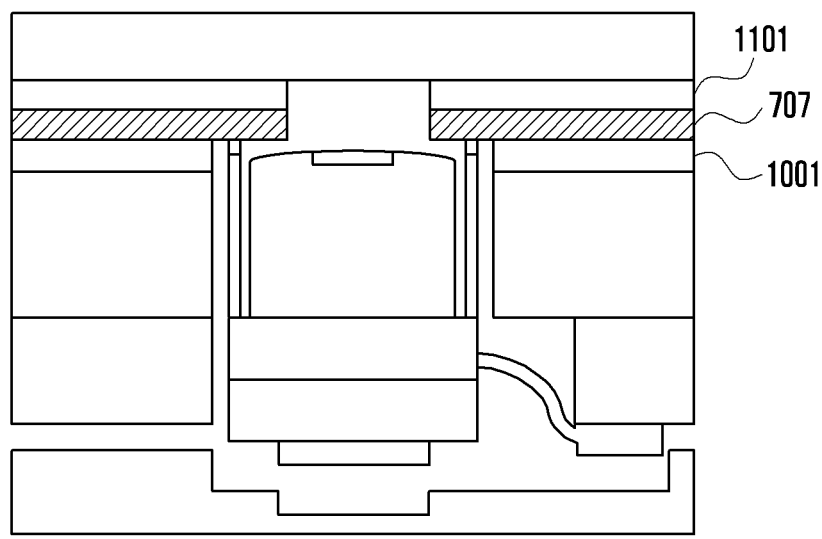
FIG. 15C is view illustrating an embodiment of variously disposing a cushion included in a support member according to various embodiments of the disclosure.

FIGS. 15A to 15C are views illustrating an embodiment of variously disposing a cushion included in a support member according to various embodiments of the disclosure.

Referring to FIG. 15A, the embossed sheet 1101 and the cushion sheet 1103 included in the support member may be disposed to be spaced apart from each other. The cushion sheet 1103 may be disposed between the electromagnetic induction panel 707 and the heat dissipation sheet 1001.

Referring to FIG. 15B, the cushion sheet 1103 may be disposed between the heat dissipation sheet 1001 and the pressure sensor 711. In this case, the wrinkle problem of the heat dissipation sheet 1001 generated in the process of pressing the electromagnetic induction panel 707 and the heat dissipation sheet 1001 (e.g., a lamination process) may be resolved. Since the cushion sheet 1103 is disposed under the heat dissipation sheet 1001, the heat dissipation sheet 1001 is capable of being protected by the cushion sheet 1103 in the lamination process.

Referring to FIG. 15C, the cushion sheet 1103 may be omitted from the electronic device of FIG. 15B. For example, among the embossed sheet 1101 and the cushion sheet 1103 included in the support member, the cushion sheet 1103 may be omitted. The thickness of the display module of the electronic device may be reduced by the thickness of the cushion sheet 1103.

Figure 16A:
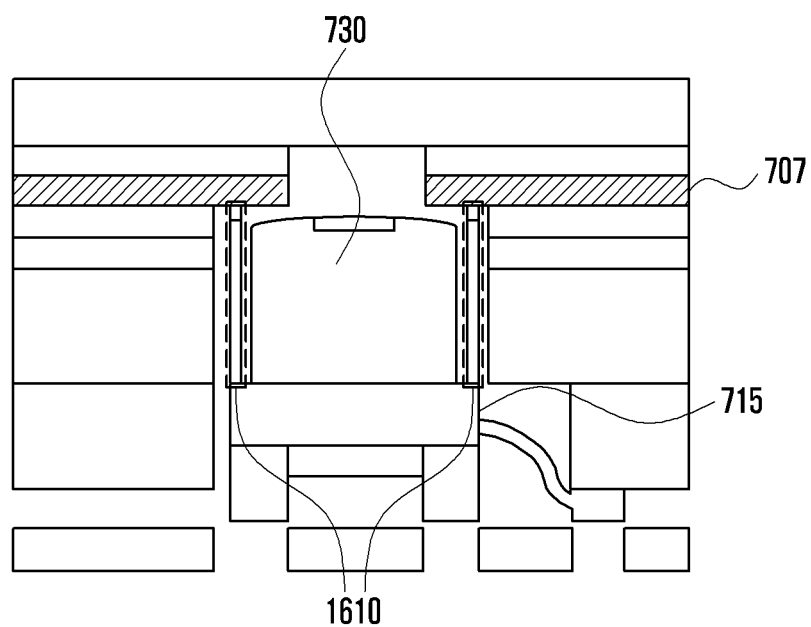
FIG. 16A is a view illustrating an embodiment of attaching a biometric sensor according to various embodiments of the disclosure to an upper panel.
Figure 16B:
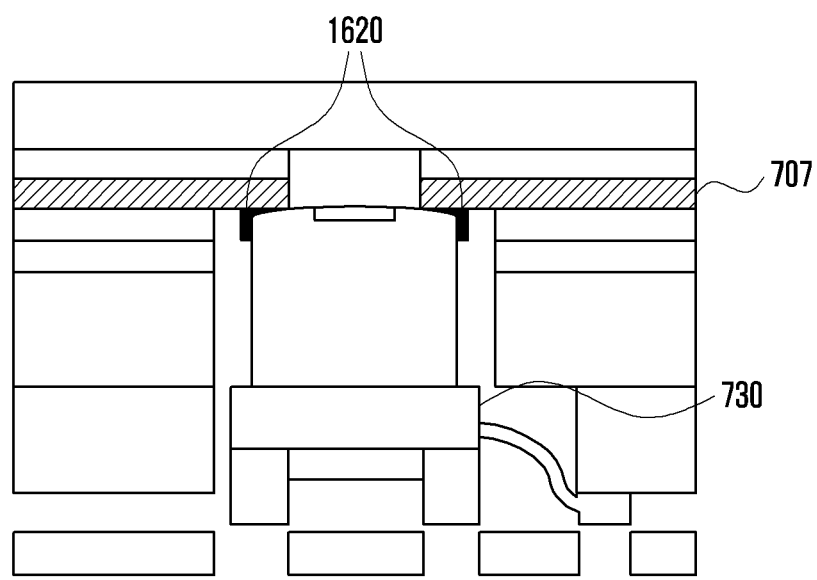
FIG. 16B is a view illustrating an embodiment of attaching a biometric sensor according to various embodiments of the disclosure to an upper panel.
Figure 16C:
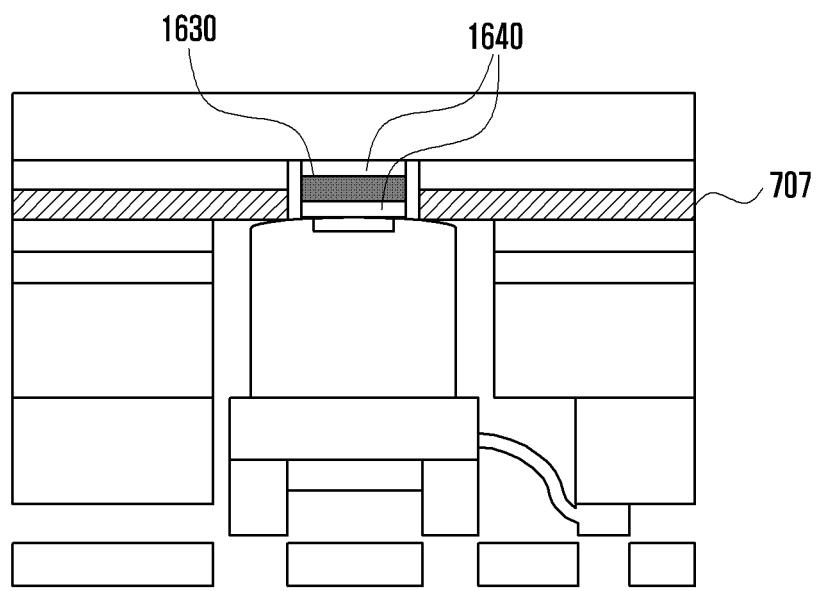
FIG. 16C is a view illustrating an embodiment of attaching a biometric sensor according to various embodiments of the disclosure to an upper panel.

FIGS. 16A to 16C are views each illustrating an embodiment of attaching a biometric sensor according to various embodiments of the disclosure to an upper panel.

Referring to FIG. 16A, the biometric sensor 730 may be attached to an upper panel (e.g., the electromagnetic induction panel 707) by a fixing member 1610. The fixing member 1610 may be a component extending from the first FPCB board 715 disposed under the biometric sensor 730.

Referring to FIG. 16B, the biometric sensor 730 may be attached to the electromagnetic induction panel 707 by a transparent adhesive member 1620 on the upper face of the biometric sensor 730.

Referring to FIG. 16C, the electronic device may include a polymer (e.g., polyester (PET), polycarbonate (PC), or polyimide (PI)) film 1630 disposed on the upper face of the biometric sensor 730. For example, the biometric sensor 730 may be attached to the electromagnetic induction panel 707 by a transparent adhesive member 1640. The electronic device may include a polymer film 1630 disposed between transparent adhesive members 1640. The polymer film 1630 is able to suppress the occurrence of bubbles when using an adhesive member. By minimizing bubbling by the polymer film 1630, a stylus pen input may be more accurate. The polymer film 1630 may compensate for the deterioration of the reception rate of a stylus pen, which is caused due to the opening of the electromagnetic induction panel 707.

Figure 17:
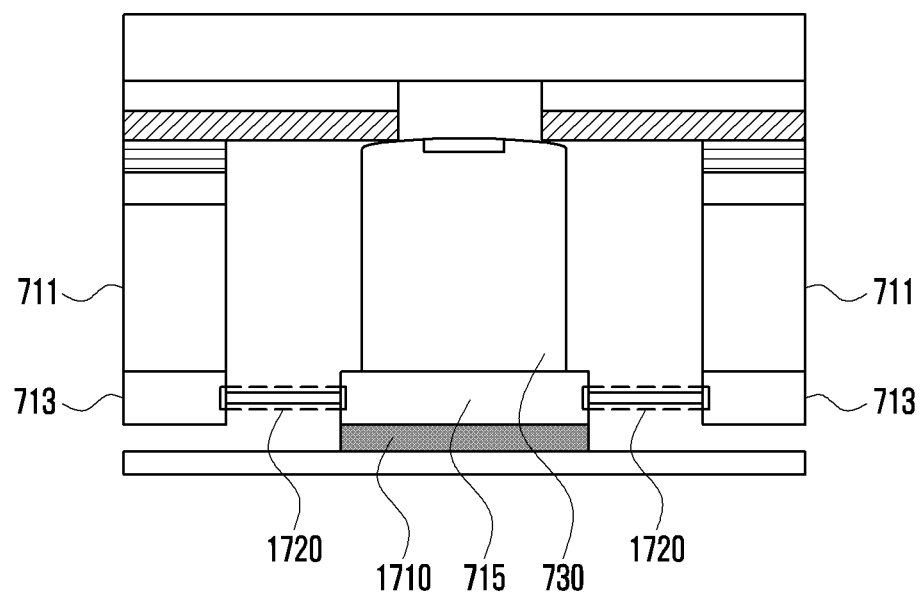
FIG. 17 is a view illustrating an embodiment in which an elastic member is disposed between a flexible printed circuit board according to various embodiments of the disclosure and a body.

FIG. 17 is a view illustrating an embodiment in which an elastic member is disposed between a flexible printed circuit board according to various embodiments of the disclosure and a body.

Referring to FIG. 17, the first FPCB 715 and the second FPCB 713 may be electrically connected by a flexible member 1720. The flexible member 1720 is a component that is relatively more flexible than the FPCBs and is able to electrically interconnect the first FPCB 715 and the second FPCB 713. A support member 1710 made of an elastic material (e.g., a poron) may be disposed under the biometric sensor 730. The support member 1710 is made of a compressible elastic material, and is able to protect the biometric sensor 730.

Figure 18A:
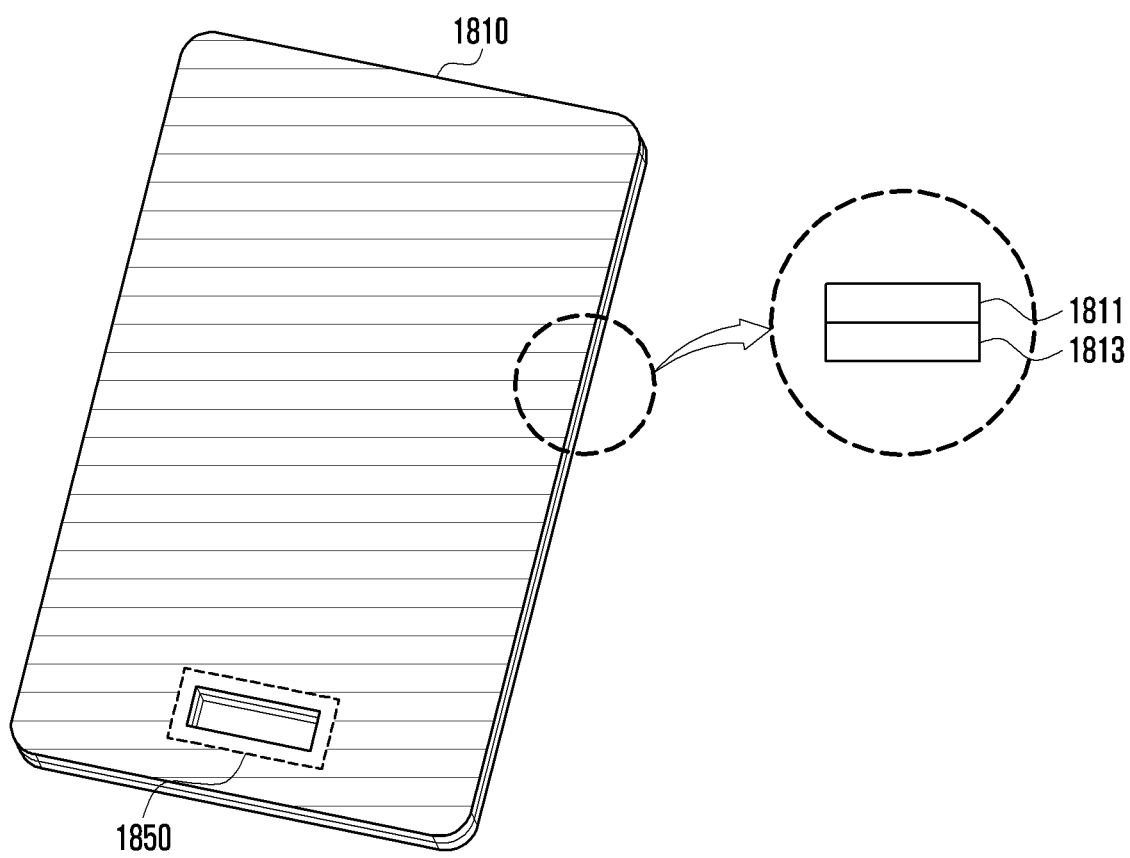
FIG. 18A is a view illustrating an electromagnetic induction panel according to various embodiments of the disclosure.
Figure 18B:
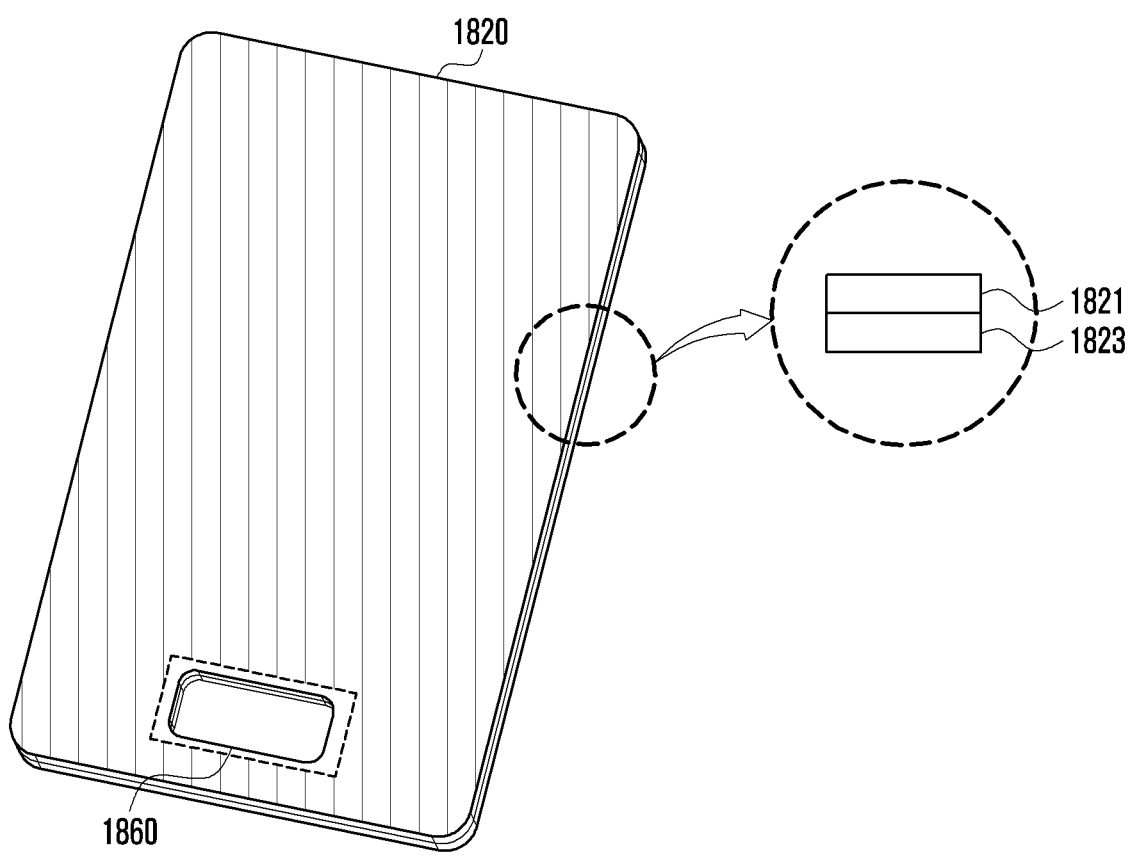
FIG. 18B is a view illustrating a heat dissipation sheet according to various embodiments of the disclosure.

FIGS. 18A and 18B are views illustrating an electromagnetic induction panel and a heat dissipation sheet according to various embodiments of the disclosure, respectively.

FIG. 18A illustrates an electromagnetic induction panel 1810 composed of a shielding sheet 1811 and a FPCB 1813. The electromagnetic induction panel 1810 may include an opening 1850 (e.g., a first opening) corresponding to the size of the fingerprint detection area of a biometric sensor included inside an electronic device. The first opening 1850 may be formed on the basis of the size of the fingerprint detection area of the biometric sensor.

FIG. 18B is a view illustrate a heat dissipation sheet 1820 composed of a copper (Cu) sheet 1821 and a graphite (Gr) sheet 1823. The heat dissipation sheet 1820 may include an opening 1860 (e.g., a second opening) corresponding to the size of the biometric sensor mounted inside the electronic device. The second opening 1860 may be formed on the basis of the size of the biometric sensor. The second opening 1860 may be larger than the first opening 1850.

Figure 19A:
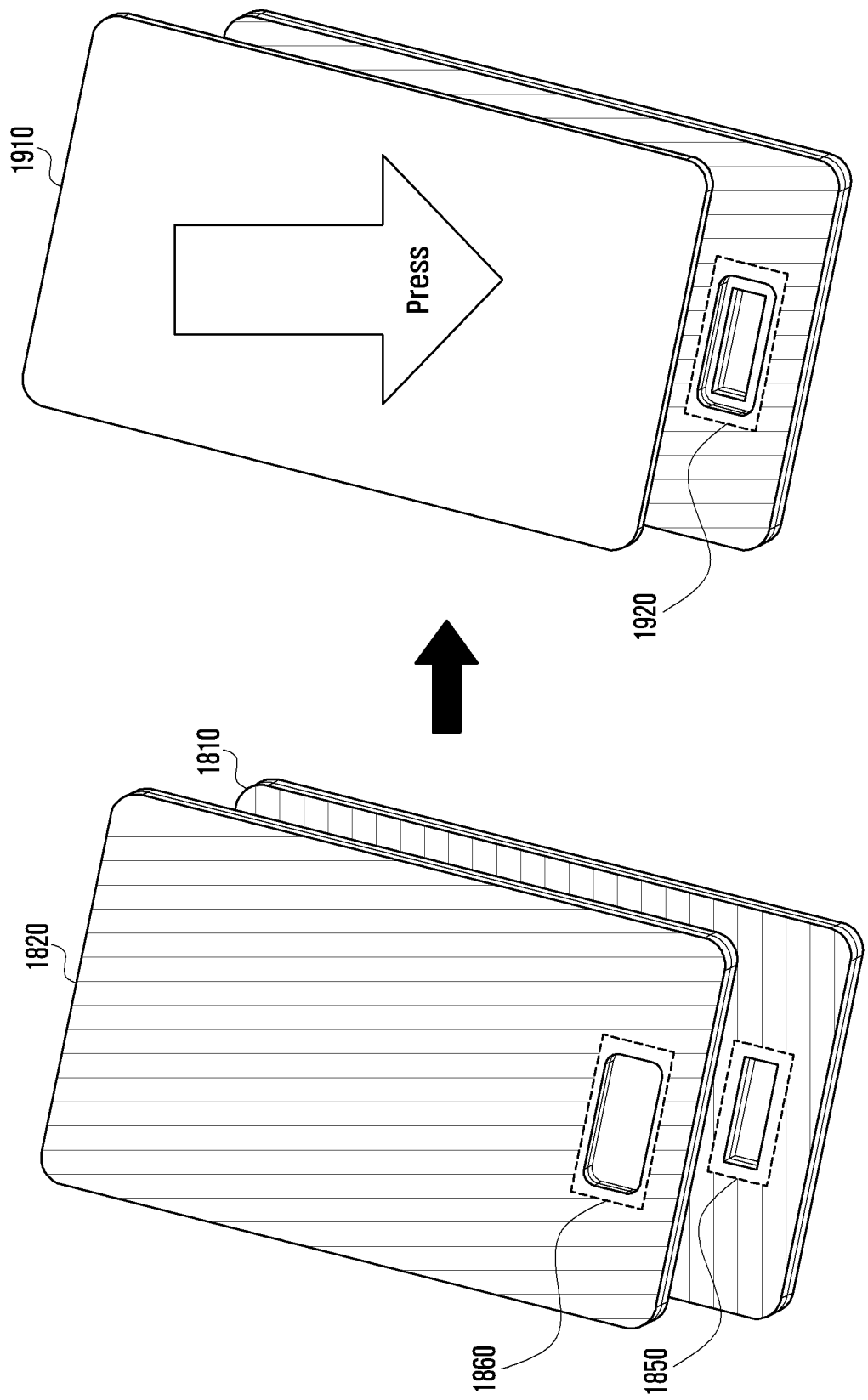
FIG. 19A is a view illustrating a method for solving a problem occurring in a lamination process of an electromagnetic induction panel and a heat dissipation sheet according to various embodiments of the disclosure.
Figure 19B:
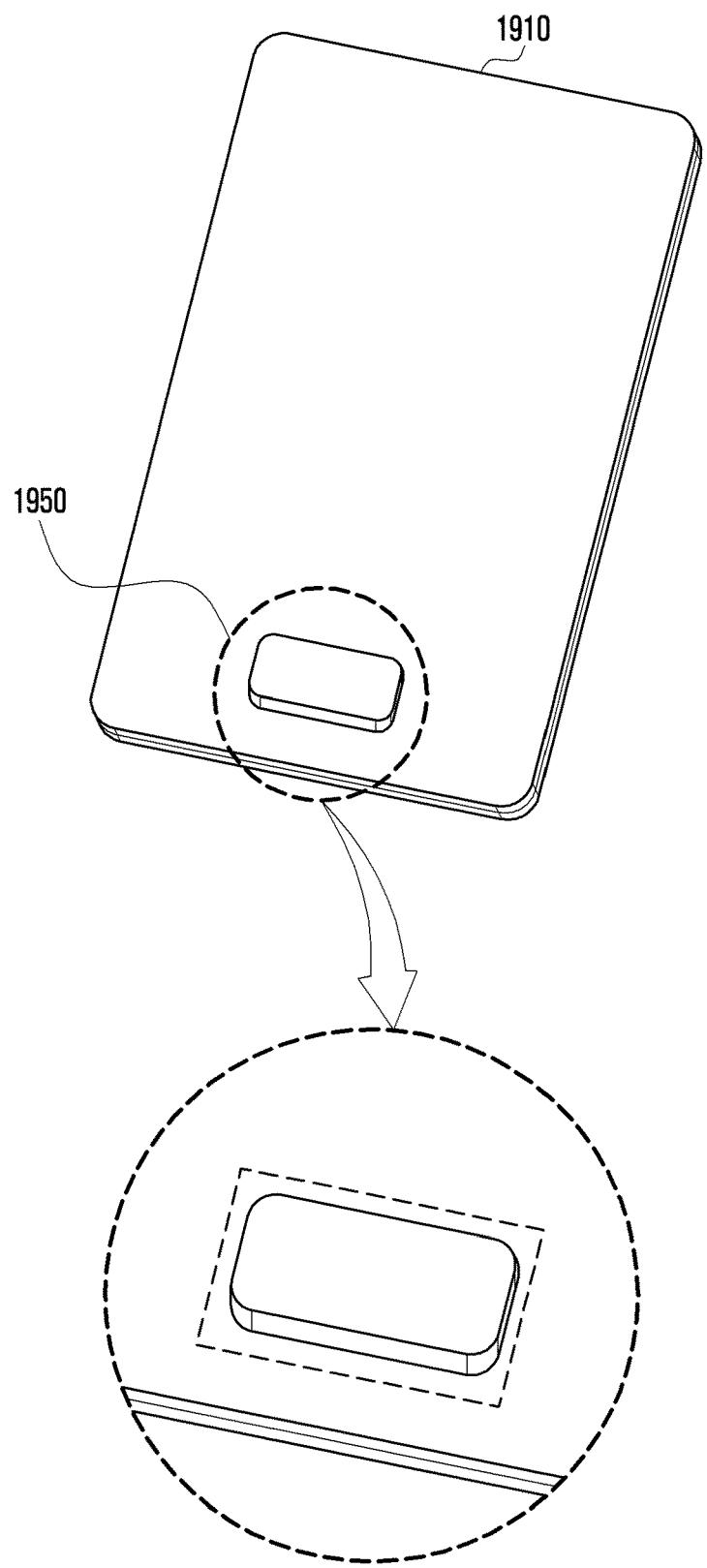
FIG. 19B is a view illustrating a method for solving a problem occurring in a lamination process of an electromagnetic induction panel and a heat dissipation sheet according to various embodiments of the disclosure.
Figure 19C:
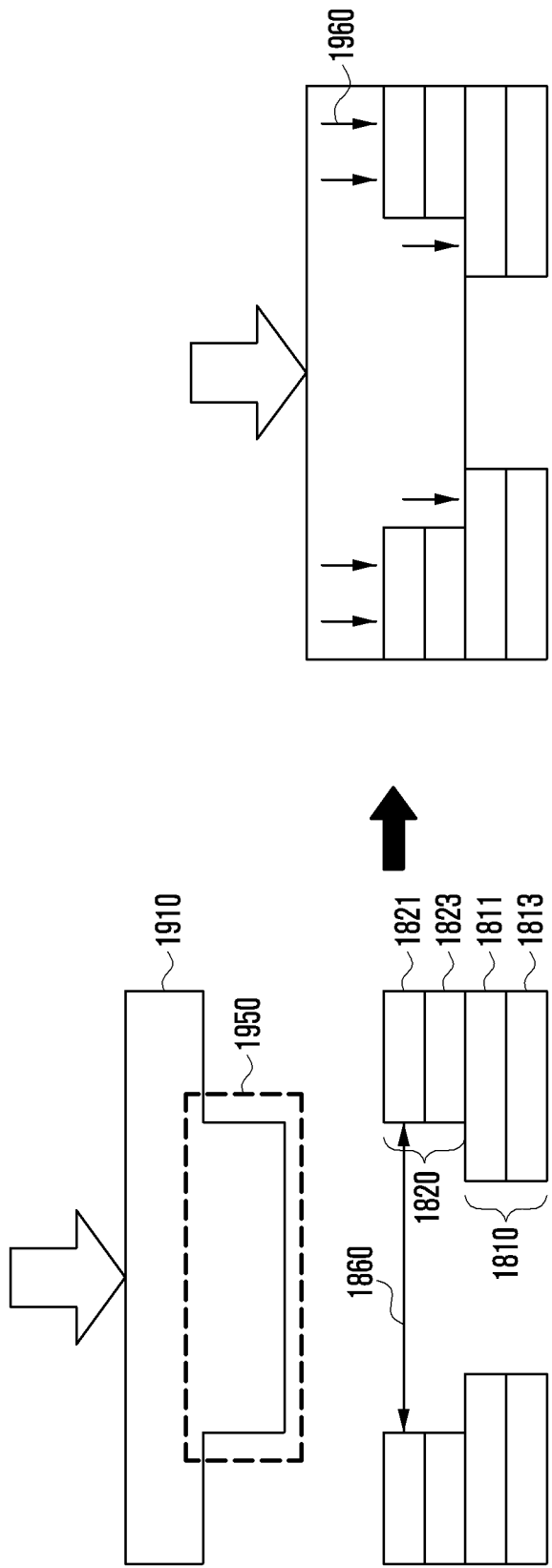
FIG. 19C is a view illustrating a method for solving a problem occurring in a lamination process of an electromagnetic induction panel and a heat dissipation sheet according to various embodiments of the disclosure.

FIGS. 19A to 19C are views each illustrating a method for solving a problem occurring in a lamination process of an electromagnetic induction panel and a heat dissipation sheet according to various embodiments of the disclosure.

FIG. 19A illustrates a lamination process for attaching an electromagnetic induction panel 1810 and a heat dissipation sheet 1820. The lamination process may be a process of arranging the electromagnetic induction panel 1810 and the heat dissipation sheet 1820 one on another, and pressing the electromagnetic induction panel 1810 and the heat dissipation sheet 1820 with a pressing jig 1910. The pressing jig 1910 may be a member that presses the entire area of the electromagnetic induction panel 1810 and the heat dissipation sheet 1820 at the same pressure.

A first opening 1850 formed in the electromagnetic induction panel 1810 and a second opening 1860 in the heat dissipation sheet 1820 are different in size, and thus, it may be difficult to transfer the same pressure in the portion 1920 in which the first opening 1850 and the second opening 1860 are disposed. The electromagnetic induction panel 1810 may be difficult to be pressed to the same thickness.

FIG. 19B illustrating a pressing jig 1910 having a protruding structure 1950 such that the same pressure is transferred even in the portion in which the first opening 1850 and the second opening 1860 are disposed. For example, on the basis of the position of the second opening 1860, the pressing jig 1910 may have the protruding structure 1950 formed in the portion corresponding to the position of the second opening 1860. The protruding structure 1950 may correspond to the size of the second opening 1860. Various embodiments may perform a lamination process in which the electromagnetic induction panel 1810 and the heat dissipation sheet 1820 are attached to each other using the pressing jig 1910 having the protruding structure 1950 formed thereon.

FIG. 19C illustrates a process of attaching the electromagnetic induction panel 1810 and the heat dissipation sheet 1820. Referring to FIG. 19C, in the electronic device, the heat dissipation sheet 1820 may be disposed on the electromagnetic induction panel 1810. The electromagnetic induction panel 1810 may be composed of a shielding sheet 1811 and a FPCB 1813, and the heat dissipation sheet 1820 may be composed of a copper (Cu) sheet 1821 and a graphite (Gr) sheet 1823. According to various embodiments, the electromagnetic induction panel 1810 and the heat dissipation sheet 1820 may be attached to each other using the pressing jig 1910. The pressing jig 1910 may be formed as a protruding structure 1950, a portion of which protrudes, in order to provide the same pressure for the entire area of the electromagnetic induction panel 1810 and the heat dissipation sheet 1820. The protruding structure 1950 may be formed on the basis of the size of the second opening 1860 of the heat dissipation sheet 1810. According to various embodiments, it is possible to provide the same pressure to the electromagnetic induction panel 1810 and the heat dissipation sheet 1820 using the pressing jig 1910 that is formed of the protruding structure 1950.

An electronic device according to various embodiments may include: a transparent cover (the transparent cover in FIG. 6); a display module (the display module 610 in FIG. 6) located under the transparent cover and including a display layer having pixels formed therein and one or more additional layers formed under the display layer, at least one of the one or more additional layers having an opening formed in at least a partial area thereof; a first printed circuit board (the first flexible printed circuit board 715 in FIG. 7A) having a biometric sensor module (the biometric module 623 in FIG. 6) disposed under the display module to face the opening; and a second printed circuit board electrically connected to the first printed circuit board and the display module (the second FPCB 713 in FIG. 7A). A pressure sensor module (the pressure sensor 621 in FIG. 6) may be disposed on the second printed circuit board in a peripheral area of the biometric sensor module under the display module.

According to various embodiments, the second printed circuit board (the second flexible printed circuit board 713 in FIG. 7A) may be disposed to be in contact with at least one side face of the first printed circuit board (the first flexible printed circuit board 715 in FIG. 7A).

According to various embodiments, the first printed circuit board may include a flexible printed circuit board connected to a partial area of the first printed circuit board, and the flexible printed circuit board may be electrically connected to a face opposite a face, on which the pressure sensor module is disposed, of the second printed circuit board.

According to various embodiments, the electronic device may further include a bracket on which the display module is seated. The bracket includes a first area spaced apart from the first printed circuit board by a first distance (the distance b in FIG. 7A) under the first printed circuit board and a second area spaced apart from the second circuit board by a second distance (the distance a in FIG. 7A) under the second PCB.

According to various embodiments, the first distance (the distance b in FIG. 7A) may be larger than the second distance (the distance a in FIG. 7A).

According to various embodiments, the one or more layers may include an embossed layer and a heat dissipation layer disposed under the embossed layer (the heat dissipation sheet 619 in FIG. 6).

According to various embodiments, the one or more layers may further include an electromagnetic induction panel layer (the electromagnetic induction panel 617 in FIG. 6) disposed between the embossed layer and the heat dissipation layer.

According to various embodiments, an opening having a first size may be formed in the partial area in each of the embossed layer and the electromagnetic induction panel layer, and an opening having a second size may be formed in the partial area in the heat dissipation layer.

According to various embodiments, the opening having the first size may be formed at least based on a size of a detection area of the biometric sensor module, and the opening having the second size may be formed at least based on a size of the biometric sensor module.

According to various embodiments, the pressure sensor module may include a first electrode (the first electrode 1201 in FIG. 12), a second electrode (the second electrode 1203 in FIG. 12), and a shield electrode (the shield electrode 1204 in FIG. 12), and the shield electrode may block interference signals generated based on the first electrode and the second electrode.

According to various embodiments, an electronic device may include: a transparent cover (the transparent cover 630 in FIG. 6); a display module (the display module 610 in FIG. 6) disposed under the transparent cover and including multiple layers, at least one of the multiple layers having an opening formed in at least a partial area; a biometric sensor module (the biometric sensor 623 in FIG. 6) disposed under the display module to face the opening; and a pressure sensor module (the pressure sensor 621 in FIG. 6) disposed under the display module and in a peripheral region of the biometric sensor module.

According to various embodiments, the electronic device may further include a bracket on which the display module is seated. The bracket includes a first area spaced apart from the biometric module by a first distance under the biometric sensor module and a second area spaced apart from the pressure sensor module by a second distance under the pressure sensor module.

According to various embodiments, the first distance may be larger than the second distance.

According to various embodiments, the one or more layers may include an embossed layer and a heat dissipation layer disposed under the embossed layer.

According to various embodiments, the one or more layers may further include an electromagnetic induction panel layer disposed between the embossed layer and the heat dissipation layer.

According to various embodiments, an opening having a first size may be formed in the partial area in each of the embossed layer and the electromagnetic induction panel layer, and an opening having a second size may be formed in the partial area in the heat dissipation layer.

According to various embodiments, the biometric sensor module may include a biometric sensor and a housing accommodating the biometric sensor, the biometric sensor may be disposed in the opening, and at least a portion of the housing may be disposed to be in contact with a peripheral area of the opening under the display module.

According to various embodiments, the electronic device may further include a first printed circuit board on which the biometric sensor module is disposed and a second printed circuit board on which the pressure sensor module is disposed, and the second printed circuit board may be electrically connected to the display module and the first printed circuit board.

According to various embodiments, the biometric sensor module may be attached using a transparent adhesive member to face the opening under the display module.

According to various embodiments, the pressure sensor module includes a first electrode, a second electrode, and a shield electrode, and the shield electrode may block interference signals generated based on the first electrode and the second electrode.

The invention claimed is:

1. An electronic device comprising:
a transparent cover;
a display module located under the transparent cover and including a display layer having pixels formed therein and one or more additional layers formed under the display layer, at least one of the one or more additional layers having an opening formed in at least a partial area thereof;
a first printed circuit board having a biometric sensor module disposed under the display module to face the opening; and
a second printed circuit board electrically connected to the first printed circuit board and the display module, wherein a pressure sensor module is disposed on the second printed circuit board in a peripheral area of the biometric sensor module under the display module.

2. The electronic device of claim 1, wherein the second printed circuit board is disposed to be in contact with at least one side face of the first printed circuit board.

3. The electronic device of claim 1, wherein the first printed circuit board includes a flexible printed circuit board connected to a partial area of the first printed circuit board, and the flexible printed circuit board is electrically connected to a face opposite a face, on which the pressure sensor module is disposed, of the second printed circuit board.

4. The electronic device of claim 1, further comprising:
a bracket on which the display module is seated,
wherein the bracket includes a first area spaced apart from the first printed circuit board by a first distance under the first printed circuit board and a second area spaced apart from the second printed circuit board by a second distance under the second printed circuit board, the first distance being larger than the second distance.

5. The electronic device of claim 1, wherein the one or more additional layers includes an embossed layer and a heat dissipation layer disposed under the embossed layer, and
the one or more additional layers further include an electromagnetic induction panel layer disposed between the embossed layer and the heat dissipation layer.

6. The electronic device of claim 5, wherein first opening having a first size is formed in the partial area in each of the embossed layer and the electromagnetic induction panel layer, and a second opening having a second size is formed in the partial area in the heat dissipation layer, and
wherein the first opening having the first size is formed at least based on a size of a detection area of the biometric sensor module, and the second opening having the second size is formed at least based on a size of the biometric sensor module.

7. The electronic device of claim 1, wherein the pressure sensor module includes a first electrode, a second electrode, and a shield electrode, and the shield electrode blocks interference signals generated based on the first electrode and the second electrode.

8. An electronic device comprising:
a transparent cover;
a display module disposed under the transparent cover and including multiple layers, at least one of the multiple layers having an opening formed in at least a partial area;

a biometric sensor module disposed under the display module to face the opening; and a pressure sensor module disposed under the display module and in a peripheral region of the biometric sensor module, wherein the multiple layers include an embossed layer, a heat dissipation layer disposed under the embossed layer, and an electromagnetic induction panel layer disposed between the embossed layer and the heat dissipation layer.

9. The electronic device of claim 8, further comprising: a bracket on which the display module is seated, wherein the bracket includes a first area spaced apart from the biometric sensor module by a first distance under the biometric sensor module and a second area spaced apart from the pressure sensor module by a second distance under the pressure sensor module.

10. The electronic device of claim 8, wherein a first opening having a first size is formed in the partial area in each of the embossed layer and the electromagnetic induction panel layer, and a second opening having a second size is formed in the partial area in the heat dissipation layer.

11. The electronic device of claim 8, wherein the biometric sensor module includes a biometric sensor and a housing accommodating the biometric sensor, the biometric sensor is disposed in the opening, and at least a portion of the housing is disposed to be in contact with a peripheral area of the opening under the display module.

12. The electronic device of claim 8, further comprising: a first printed circuit board on which the biometric sensor module is disposed and a second printed circuit board on which the pressure sensor module is disposed, and the second printed circuit board is electrically connected to the display module and the first printed circuit board.

13. The electronic device of claim 8, wherein the biometric sensor module is attached using a transparent adhesive member to face the opening under the display module.

14. The electronic device of claim 8, wherein the pressure sensor module includes a first electrode, a second electrode, and a shield electrode, and the shield electrode blocks interference signals generated based on the first electrode and the second electrode.

* * * * *